United States Patent
Cho et al.

(10) Patent No.: US 12,470,646 B2
(45) Date of Patent: Nov. 11, 2025

(54) ELECTRONIC DEVICE INCLUDING PRESSURE SENSOR

(71) Applicant: Samsung Electronics Co., Ltd., Suwon-si (KR)

(72) Inventors: Joongyeon Cho, Suwon-si (KR); Youngmin Kang, Suwon-si (KR); Moonchul Shin, Suwon-si (KR); Yeonggyu Yoon, Suwon-si (KR); Seungjoon Lee, Suwon-si (KR); Junyoung Choi, Suwon-si (KR); Hyunsuk Kim, Suwon-si (KR); Sanghyuk Park, Suwon-si (KR); Wonho Lee, Suwon-si (KR); Nakhyun Choi, Suwon-si (KR); Soyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 18/156,160

(22) Filed: Jan. 18, 2023

(65) Prior Publication Data
US 2023/0275983 A1     Aug. 31, 2023

Related U.S. Application Data

(63) Continuation of application No. PCT/KR2022/019869, filed on Dec. 8, 2022.

(30) Foreign Application Priority Data

Jan. 7, 2022 (KR) .................. 10-2022-0002621
Feb. 18, 2022 (KR) .................. 10-2022-0021633

(51) Int. Cl.
*H04M 1/02* (2006.01)
*G06F 1/16* (2006.01)
*H05K 5/02* (2006.01)

(52) U.S. Cl.
CPC ........ *H04M 1/0237* (2013.01); *G06F 1/1624* (2013.01); *G06F 1/1652* (2013.01); *H04M 1/0268* (2013.01); *H05K 5/0217* (2013.01)

(58) Field of Classification Search
CPC ............. H04M 1/0237; H04M 1/0268; H04M 1/0241; H04M 1/026; H04M 1/72454;
(Continued)

(56) References Cited

U.S. PATENT DOCUMENTS 10,708,395 B1 * 7/2020 Han ...................... G06F 1/1652
10,921,920 B1 * 2/2021 Rosenberg .......... G06F 3/04845
(Continued)

FOREIGN PATENT DOCUMENTS

CN     214069968 U   *   8/2021
EP     2 439 608 A1     4/2012
(Continued)

OTHER PUBLICATIONS

International Search Report dated Feb. 24, 2023, issued in International Application No. PCT/KR2022/019869.

*Primary Examiner* — Nizar N Sivji
(74) *Attorney, Agent, or Firm* — Jefferson IP Law, LLP

(57) ABSTRACT

An electronic device is provided. The electronic device includes a first housing, a second housing slidable relative to the first housing, a contact member disposed in the first housing, a pressure sensor disposed in the second housing to face the contact member and provided in a state in which at least a portion of the pressure sensor is in contact with the contact member, a printed circuit board (PCB) disposed in the second housing, an actuator configured to drive the second housing, and a processor disposed on the PCB, electrically connected to the pressure sensor and the actuator, and configured to control the actuator, based on pressure information sensed by the pressure sensor.

23 Claims, 20 Drawing Sheets

(58) Field of Classification Search
CPC .............. H04M 2250/12; G06F 1/1624; G06F 1/1652; G06F 1/1671; G06F 1/1677; H05K 5/0217
See application file for complete search history.

(56) References Cited

U.S. PATENT DOCUMENTS

| | | | |
|---|---|---|---|
| 10,972,592 B2 | 4/2021 | Song et al. | |
| 2020/0120814 A1* | 4/2020 | Huang | H04M 1/0268 |
| 2020/0196496 A1* | 6/2020 | Shin | G06F 1/203 |
| 2020/0267247 A1 | 8/2020 | Song et al. | |
| 2021/0021264 A1* | 1/2021 | Ji | H03K 17/9622 |
| 2021/0089187 A1* | 3/2021 | Hong | G06F 3/0443 |
| 2021/0278945 A1* | 9/2021 | Li | G06F 3/0483 |
| 2021/0368634 A1* | 11/2021 | Song | G06F 1/1652 |
| 2021/0405703 A1 | 12/2021 | Song et al. | |
| 2022/0272852 A1* | 8/2022 | Park | G06F 1/1652 |
| 2024/0023255 A1* | 1/2024 | Wang | G09F 9/301 |
| 2024/0241548 A1* | 7/2024 | Barrett | G04G 17/045 |

FOREIGN PATENT DOCUMENTS

| | | | |
|---|---|---|---|
| EP | 4195631 B1 * | 1/2025 | |
| JP | 2009-088667 A | 4/2009 | |
| JP | 2011-035462 A | 2/2011 | |
| JP | 4733678 B2 | 7/2011 | |
| JP | 5259517 B2 | 8/2013 | |
| KR | 10-2004-0108134 A | 12/2004 | |
| KR | 10-2006-0081259 A | 7/2006 | |
| KR | 10-2008-0068175 A | 7/2008 | |
| KR | 10-1002898 B1 | 12/2010 | |
| KR | 10-1315961 B1 | 10/2013 | |
| KR | 10-2290899 B1 | 8/2021 | |
| WO | WO 2020241926 A1 * | 12/2020 | |

* cited by examiner

ELECTRONIC DEVICE INCLUDING PRESSURE SENSOR

CROSS-REFERENCE TO RELATED APPLICATION(S)

This application is a continuation application, claiming priority under § 365(c), of an International application No. PCT/KR2022/019869, filed on Dec. 8, 2022, which is based on a claims the benefit of a Korean patent application number 10-2022-0002621, filed on Jan. 7, 2022, in the Korean Intellectual Property Office, and of a Korean patent application number 10-2022-0021633, filed on Feb. 18, 2022, in the Korean Intellectual Property Office, the disclosure of each of which is incorporated by reference herein in its entirety.

BACKGROUND

1. Field

The disclosure relates to an electronic device including a pressure sensor.

2. Description of Related Art

Electronic devices including flexible displays are being developed. For example, one housing may move relative to another housing such that a screen display area of a display may expand or reduce.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that senses a relative movement of a first housing and a second housing by using a pressure sensor to detect a relative position of the first housing and the second housing.

Another aspect of the disclosure is to provide an electronic device that, when an intensity of pressure input to a pressure sensor exceeds a predetermined intensity, recognizes the pressure as an event for a change between an open state and a closed state, and moves any one of the first housing and the second housing relative to the other one.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing slidable relative to the first housing, a contact member disposed in the first housing, a pressure sensor disposed in the second housing to face the contact member and provided in a state in which at least a portion of the pressure sensor is in contact with the contact member, a printed circuit board (PCB) disposed in the second housing, an actuator configured to drive the second housing, and a processor disposed on the PCB, electrically connected to the pressure sensor and the actuator, and configured to recognize a position of the second housing with respect to the first housing, and control the actuator to move the second housing relative to the first housing, when an intensity of pressure sensed by the pressure sensor is greater than an intensity of predetermined pressure.

In accordance with another aspect of the disclosure, an electronic device is provided. The electronic device includes a first housing, a second housing slidable relative to the first housing, a contact member disposed in the first housing, a pressure sensor disposed in the second housing to face the contact member and provided in a state in which at least a portion of the pressure sensor is in contact with the contact member, and a support including a main support plate disposed in the first housing, and a support shaft fixed to the main support plate and rotatably supporting the contact member.

In accordance with another aspect of the disclosure, an electronic device is provided. The electronic device includes a first housing, a second housing slidable relative to the first housing, a contact member disposed in the first housing, a pressure sensor disposed in the second housing to face the contact member and provided in a state in which at least a portion of the pressure sensor is in contact with the contact member, a support including a main support plate disposed in the first housing, and a support shaft fixed to the main support plate and rotatably supporting the contact member, a PCB disposed in the second housing, an actuator configured to drive the second housing, and a processor disposed on the PCB, electrically connected to the pressure sensor and the actuator, and configured to recognize a position of the second housing with respect to the first housing, and control the actuator to move the second housing relative to the first housing, when an intensity of pressure sensed by the pressure sensor is greater than an intensity of predetermined pressure.

The electronic device according to an embodiment may detect the relative positions of the first housing and the second housing by sensing a relative movement of the first housing and the second housing by using the pressure sensor.

The electronic device according to an embodiment may, when an intensity of pressure input to a pressure sensor exceeds a predetermined intensity, recognize the pressure as an event for a change between an open state and a closed state, and move any one of the first housing and the second housing relative to the other one.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
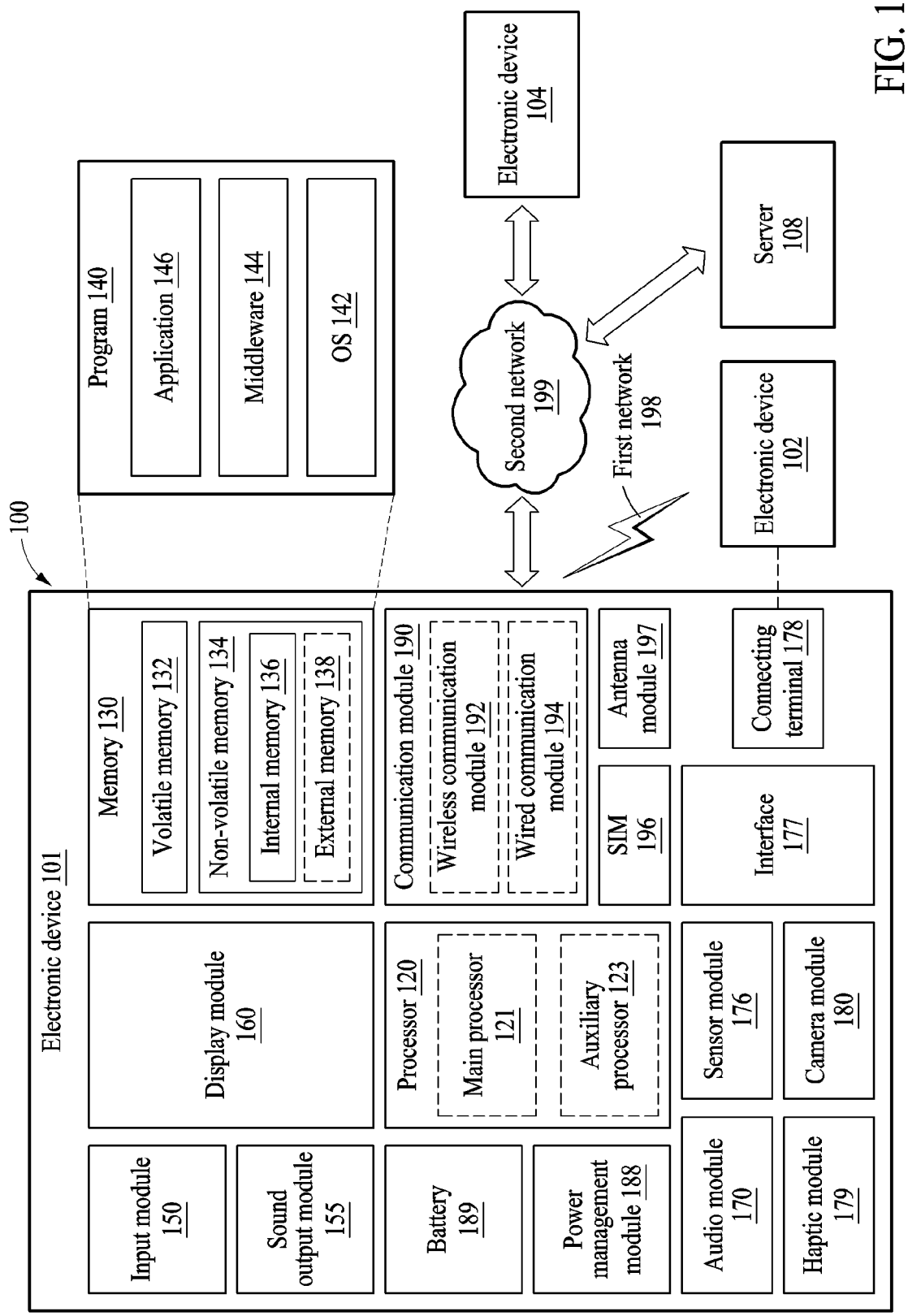
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the above components may be omitted from the electronic device 101, or one or more other components may be added to the electronic device 101. In an embodiment, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). A learning algorithm may include, but is not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., an LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a PCB). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form an mm Wave antenna module. According to an embodiment, the mm Wave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that an embodiment of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., by wire), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2A:
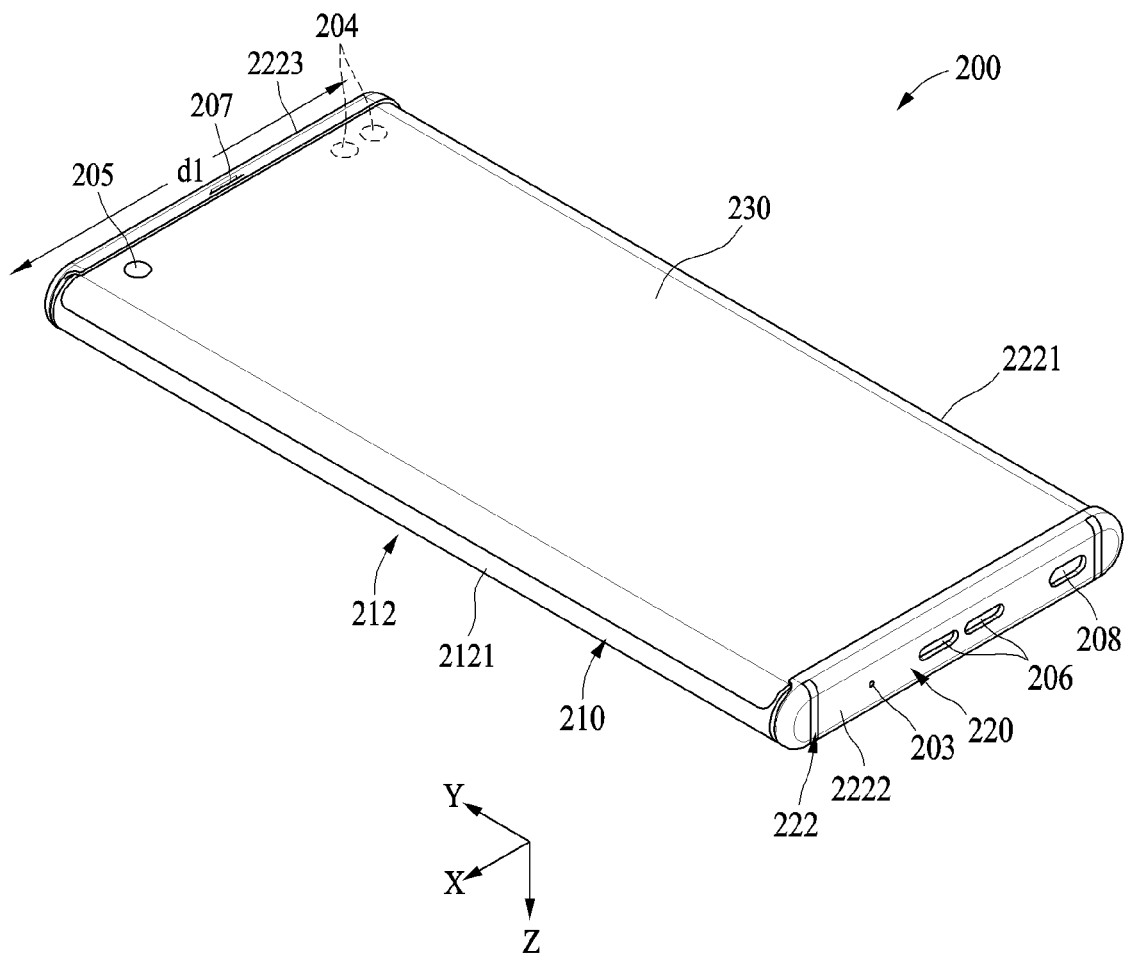
FIG. 2A is a front perspective view illustrating a closed state of an electronic device according to an embodiment of the disclosure.

FIG. 2A is a front perspective view illustrating a closed state of an electronic device according to an embodiment of the disclosure.

Figure 2B:
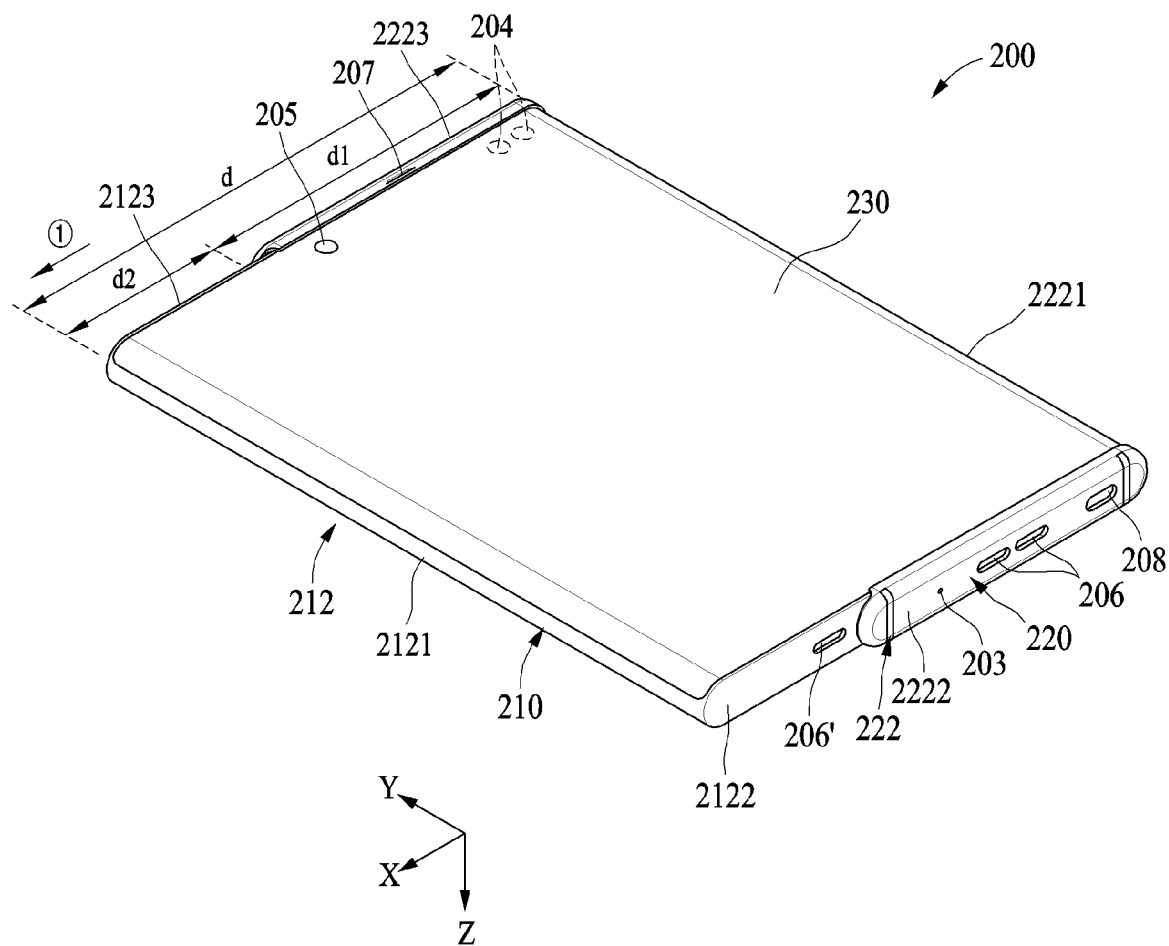
FIG. 2B is a front perspective view illustrating an open state of an electronic device according to an embodiment of the disclosure.

FIG. 2B is a front perspective view illustrating an open state of an electronic device according to an embodiment of the disclosure.

Figure 2C:
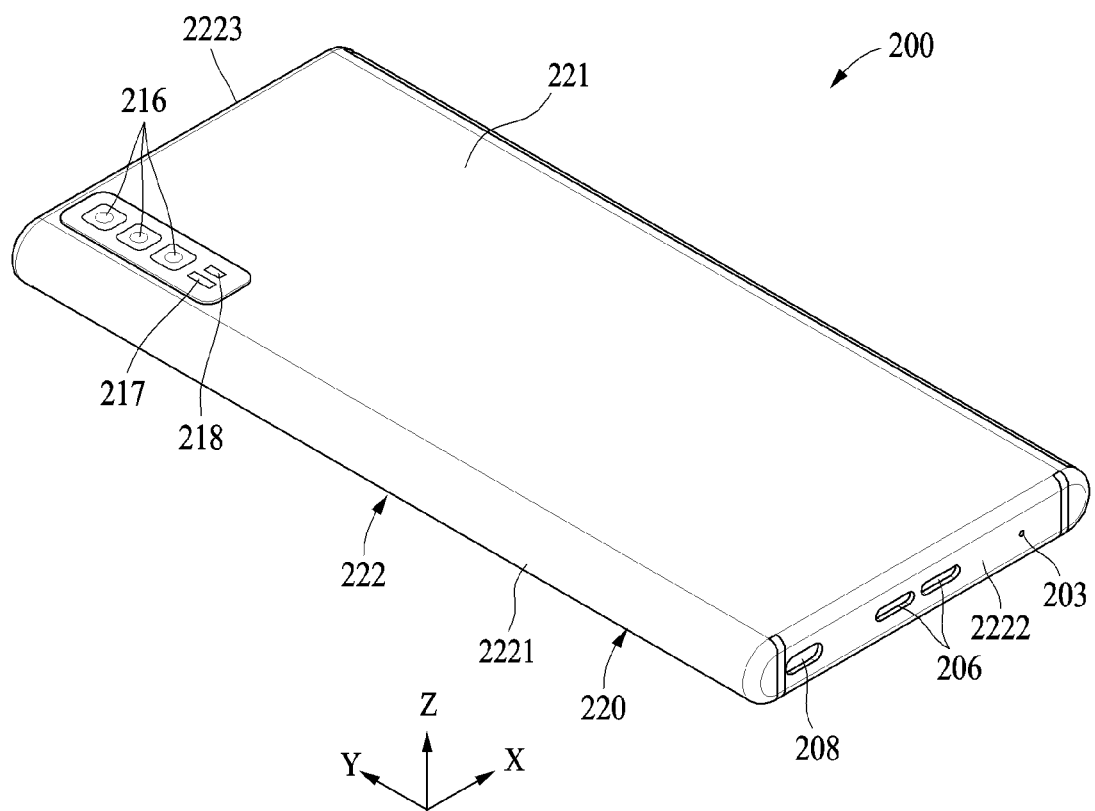
FIG. 2C is a rear perspective view illustrating a closed state of an electronic device according to an embodiment of the disclosure.

FIG. 2C is a rear perspective view illustrating a closed state of an electronic device according to an embodiment of the disclosure.

Figure 2D:
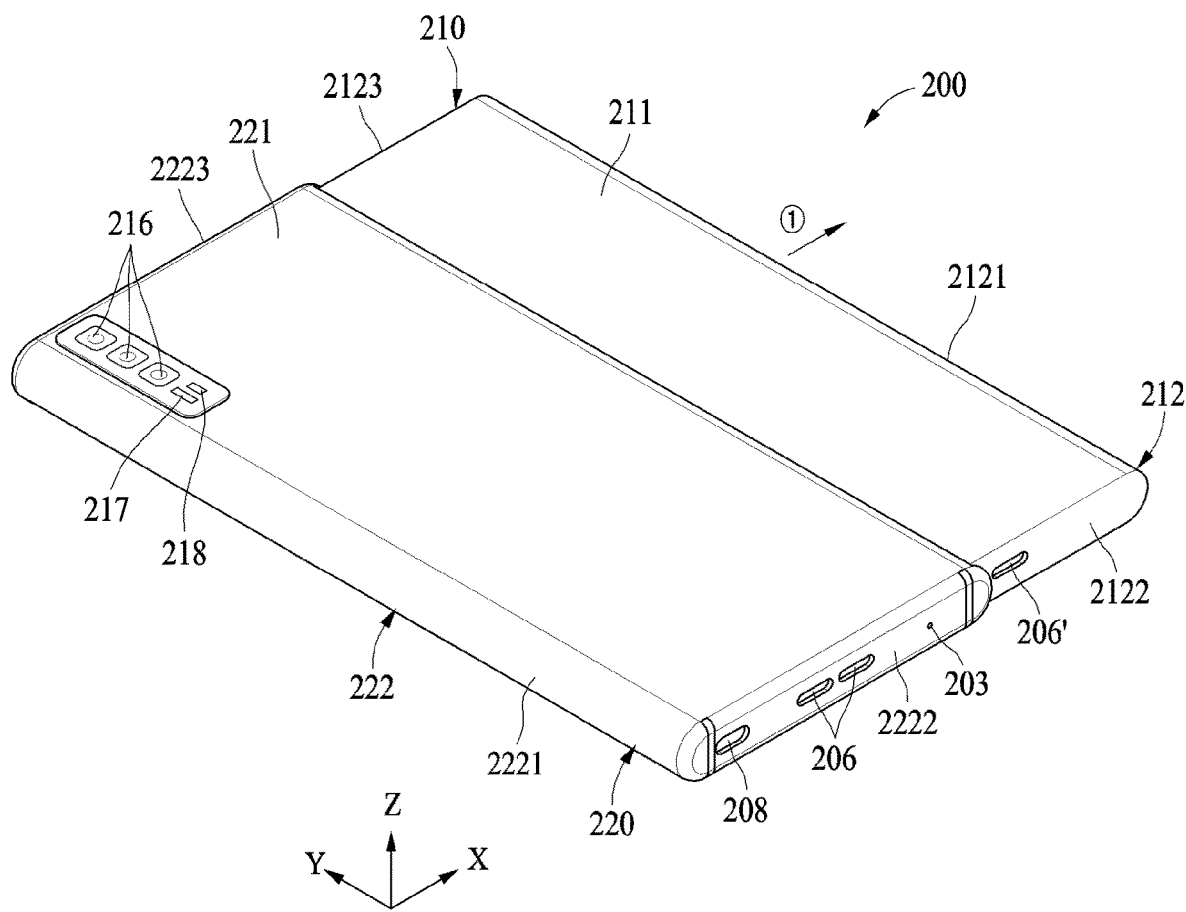
FIG. 2D is a rear perspective view illustrating an open state of an electronic device according to an embodiment of the disclosure.

FIG. 2D is a rear perspective view illustrating an open state of an electronic device according to an embodiment of the disclosure.

Referring to FIGS. 2A to 2D, an electronic device 200 (e.g., an electronic device 101 of FIG. 1) may include a first housing 210, and a second housing 220 that is movably coupled relative to the first housing 210.

In an embodiment, the first housing 210 may include a first plate 211 and a first side frame 212 that extends in a substantially vertical direction (e.g., a +/−z-axis direction) along an edge of the first plate 211. In an embodiment, the first side frame 212 may include a first side surface 2121, a second side surface 2122 extending from one end of the first side surface 2121, and a third side surface 2123 extending from the other end of the first side surface 2121. In an embodiment, the first housing 210 may include a first space that is at least partially closed from the outside by the first plate 211 and the first side frame 212.

In an embodiment, the second housing 220 may include a second plate 221 and a second side frame 222 that extends in a substantially vertical direction (e.g., the z-axis direction) along an edge of the second plate 221. In an embodiment, the second side frame 222 may include a fourth side surface 2221 facing away from the first side surface 2121, a fifth side surface 2222 extending from one end of the fourth side surface 2221 and at least partially coupled to the second side surface 2122, and a sixth side surface 2223 extending from the other end of the fourth side surface 2221 and at least partially coupled to the third side surface 2123. In an embodiment, the fourth side surface 2221 may also extend from a structure other than the second plate 221 and may be coupled to the second plate 221. In an embodiment, the second housing 220 may include a second space that is at least partially closed from the outside by the second plate 221 and the second side frame 222.

In an embodiment, the first plate 211 and the second plate 221 may be disposed to at least partially form a rear surface of the electronic device 200. For example, the first plate 211, the second plate 221, the first side frame 212, and/or the second side frame 222 may be formed of, for example, polymer, coated or colored glass, ceramic, metal (e.g., aluminum, stainless steel (STS), or magnesium), or a combination of two or more of the above materials.

In an embodiment, the electronic device 200 may include a flexible display 230 disposed to be supported by the first housing 210 and the second housing 220. In an embodiment, the flexible display 230 may include a flat portion supported by the second housing 220, and a bendable portion extending from the flat portion and supported by the first housing 210. In an embodiment, the bendable portion of the flexible display 230 may be disposed in the first space of the first housing 210 not to be visually exposed to the outside when the electronic device 200 is closed, and may be visually exposed to the outside to extend from the flat portion while being supported by the first housing 210 when the electronic device 200 is open. For example, the electronic device 200 may be a rollable electronic device in which a display screen of the flexible display 230 expands in response to an open operation according to a movement of the first housing 210 from the second housing 220.

In an embodiment, the first housing 210 may be at least partially inserted into the second space of the second housing 220 and may be coupled to the first housing 210 be movable in a direction ①. For example, in the closed state, the electronic device 200 may be maintained in a state in which the first housing 210 is coupled to the second housing 220 such that a distance between the first side surface 2121 and the fourth side surface 2221 is a first distance d1. In an embodiment, in the open state, the electronic device 200 may be maintained in a state in which the first housing 210 protrudes from the second housing 220 to have an interval distance d in which the first side surface 2121 protrudes from the fourth side surface 2221 by a second distance d2. In an embodiment, the flexible display 230 may be supported by the first housing 210 and/or the second housing 220 such that both end portions thereof have curved edges, in the open state.

In an embodiment, the electronic device 200 may automatically change between the open state and the closed state by using an actuator (e.g., an actuator 330) disposed in the first space and/or the second space. For example, a processor (e.g., the processor 120 of FIG. 1) of the electronic device 200 may be configured to control an operation of the first housing 210 by using the actuator when an event for a change between the open state and the closed state of the electronic device 200 is detected. In one example, the first housing 210 may manually protrude from the second housing 220 through a user's manipulation. The first housing 210 may protrude by a protrusion amount desired by the user, and thus, a screen of the flexible display 230 may vary to have various display areas. Accordingly, the processor (e.g., the processor 120 of FIG. 1) of the electronic device 200 may display an object in various ways in response to a display area corresponding to a predetermined protrusion amount of the first housing 210 and may control execution of an application program.

In an embodiment, the electronic device 200 may include at least one of an input device 203, sound output devices 206 and 207, sensor modules 204 and 217, camera devices 205 and 216, a connector port 208, a key input device (not shown), or an indicator (not shown). In an embodiment, the electronic device 200 may omit at least one of the components or may additionally include other components.

In an embodiment, the input device 203 may include a microphone. In an embodiment, the input device 203 may include a plurality of microphones arranged to sense a direction of sound. The sound output devices 206 and 207 may include speakers 206 and 207 and also may be referred to as such. For example, the speakers 206 and 207 may include an external speaker 206 and a phone call receiver 207. In an embodiment, when an external speaker 206' is disposed in the first housing 210, sound may be output through a speaker hole 206 formed in the second housing 220 in the closed state. In an embodiment, the microphone 203 or the connector port 208 may also be formed to have substantially the same configuration. In an embodiment, the sound output devices 206 and 207 may include a speaker (e.g., a piezo speaker) that operates without a separate speaker hole 206.

In an embodiment, sensor modules 204 and 217 may generate an electrical signal or a data value corresponding to an internal operating state of the electronic device 200 or an external environmental state. The sensor modules 204 and 217 may include, for example, a first sensor module 204 (e.g., a proximity sensor or an illuminance sensor) disposed on a front surface of the second housing 220, and/or a second sensor module 217 (e.g., a heart rate monitoring (HRM) sensor) disposed on a rear surface of the second housing 220. In an embodiment, the first sensor module 204 may be disposed below the flexible display 230 in the second housing 220. According to an example embodiment, the first sensor module 204 may include at least one of a proximity sensor, an illuminance sensor, a time of flight (ToF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

In an embodiment, the camera devices 205 and 216 may include a first camera device 205 disposed on the front surface of the second housing 220 of the electronic device 200, and a second camera device 216 disposed on the rear surface of the second housing 220. In an embodiment, the electronic device 200 may include a flash 218 located near the second camera device 216. In an embodiment, the camera devices 205 and 216 may include one or more lenses, an image sensor, and/or an ISP. In an embodiment, the first camera device 205 may be disposed under the flexible display 230 and may be configured to capture an object through a portion of an active area of the flexible display 230. In an embodiment, the flash 218 may include, for example, a light-emitting diode (LED) or a xenon lamp. In an embodiment, two or more lenses (e.g., a wide-angle lens and a telephoto lens) and image sensors may be disposed on one surface of the electronic device 200.

In an embodiment, the electronic device 200 may include at least one antenna (not shown). In an embodiment, the at least one antenna may wirelessly communicate with an external electronic device (e.g., the electronic device 104 of FIG. 1) or may wirelessly transmit and receive power required for charging. In an embodiment, the antenna may include a legacy antenna, an mmWave antenna, a near field communication (NFC) antenna, a wireless charging antenna, and/or a magnetic secure transmission (MST) antenna. In an embodiment, an antenna structure may be formed by using at least a portion of the first side frame 212 and/or the second side frame 222, which are formed of metal.

Figure 3A:
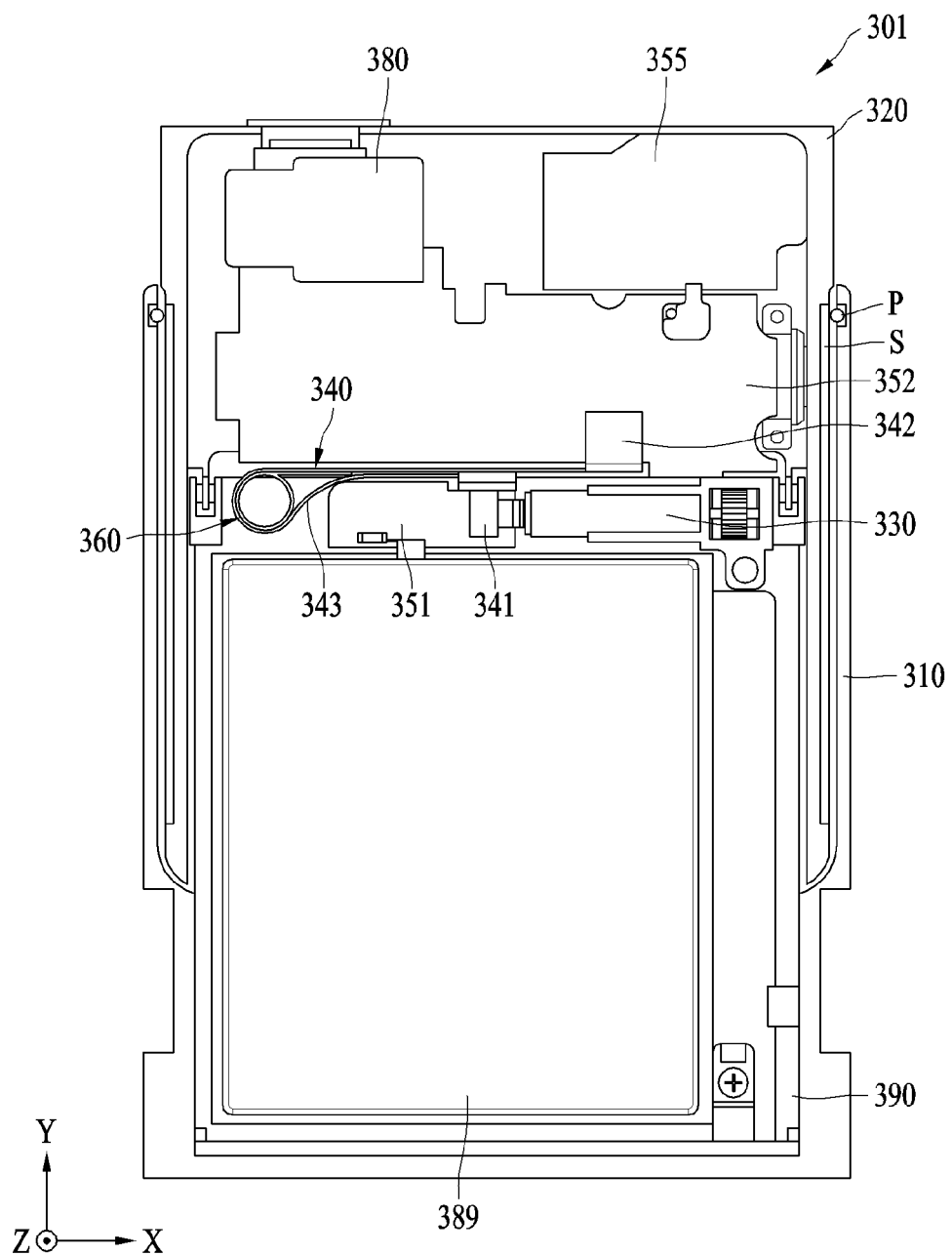
FIG. 3A is a diagram schematically illustrating an electronic device in a closed state according to an embodiment of the disclosure.

FIG. 3A is a diagram schematically illustrating an electronic device in a closed state according to an embodiment of the disclosure.

Figure 3B:
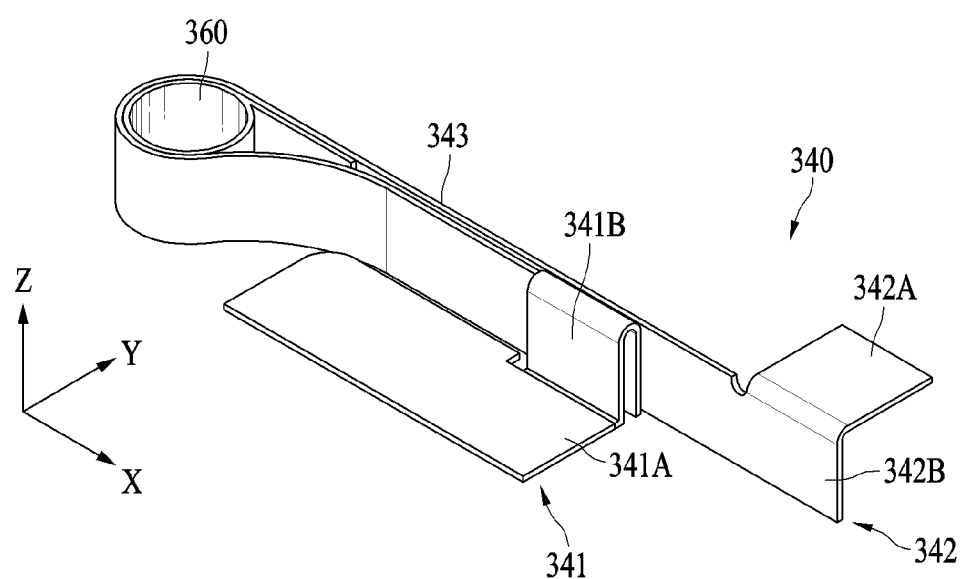
FIG. 3B is a perspective view of a connecting assembly in a folded form in an electronic device in a closed state according to an embodiment of the disclosure.

FIG. 3B is a perspective view of a connecting assembly in a folded form in an electronic device in a closed state according to an embodiment of the disclosure.

Figure 3C:
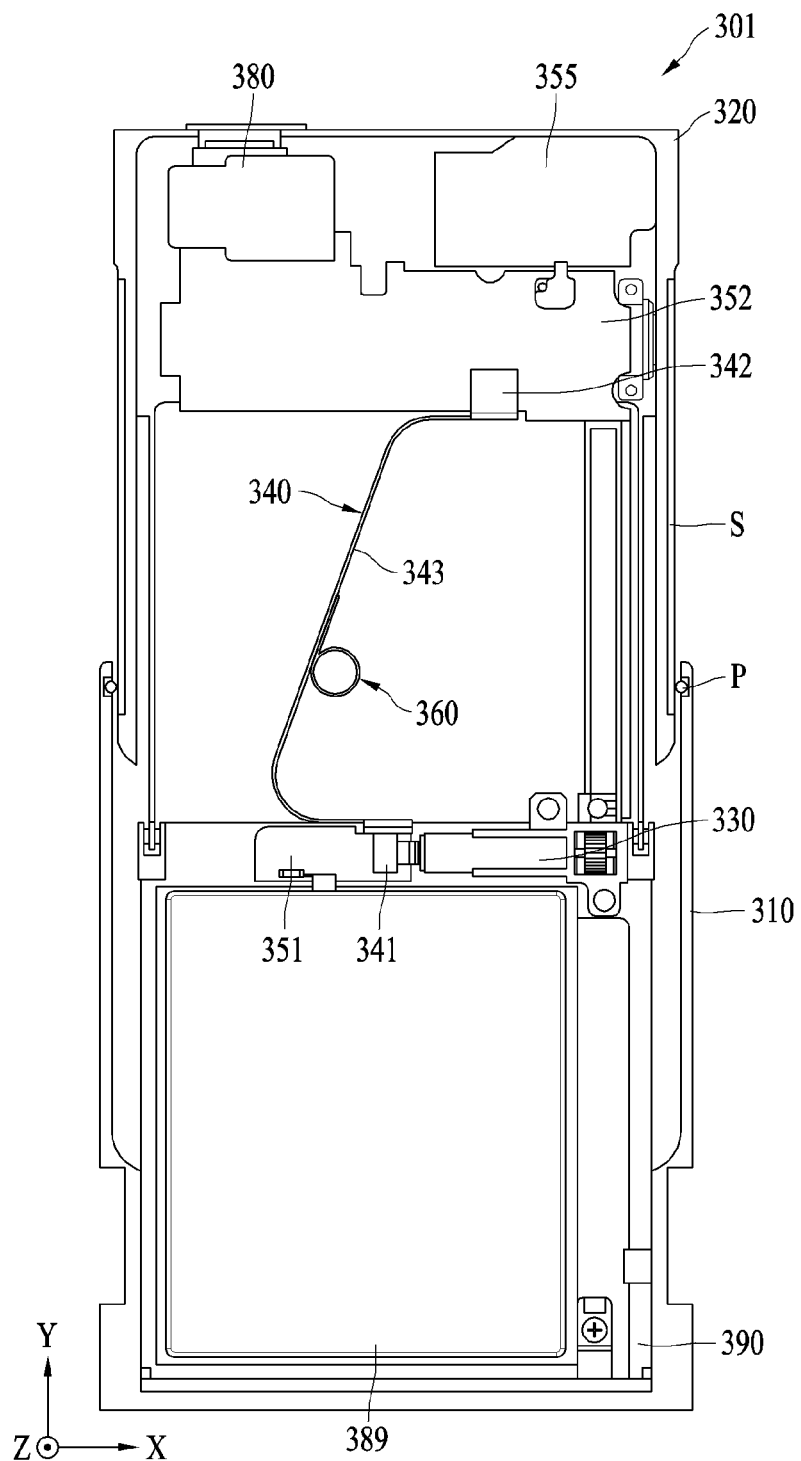
FIG. 3C is a diagram illustrating an electronic device in an open state according to an embodiment of the disclosure.

FIG. 3C is a diagram illustrating an electronic device in an open state according to an embodiment of the disclosure.

Figure 3D:
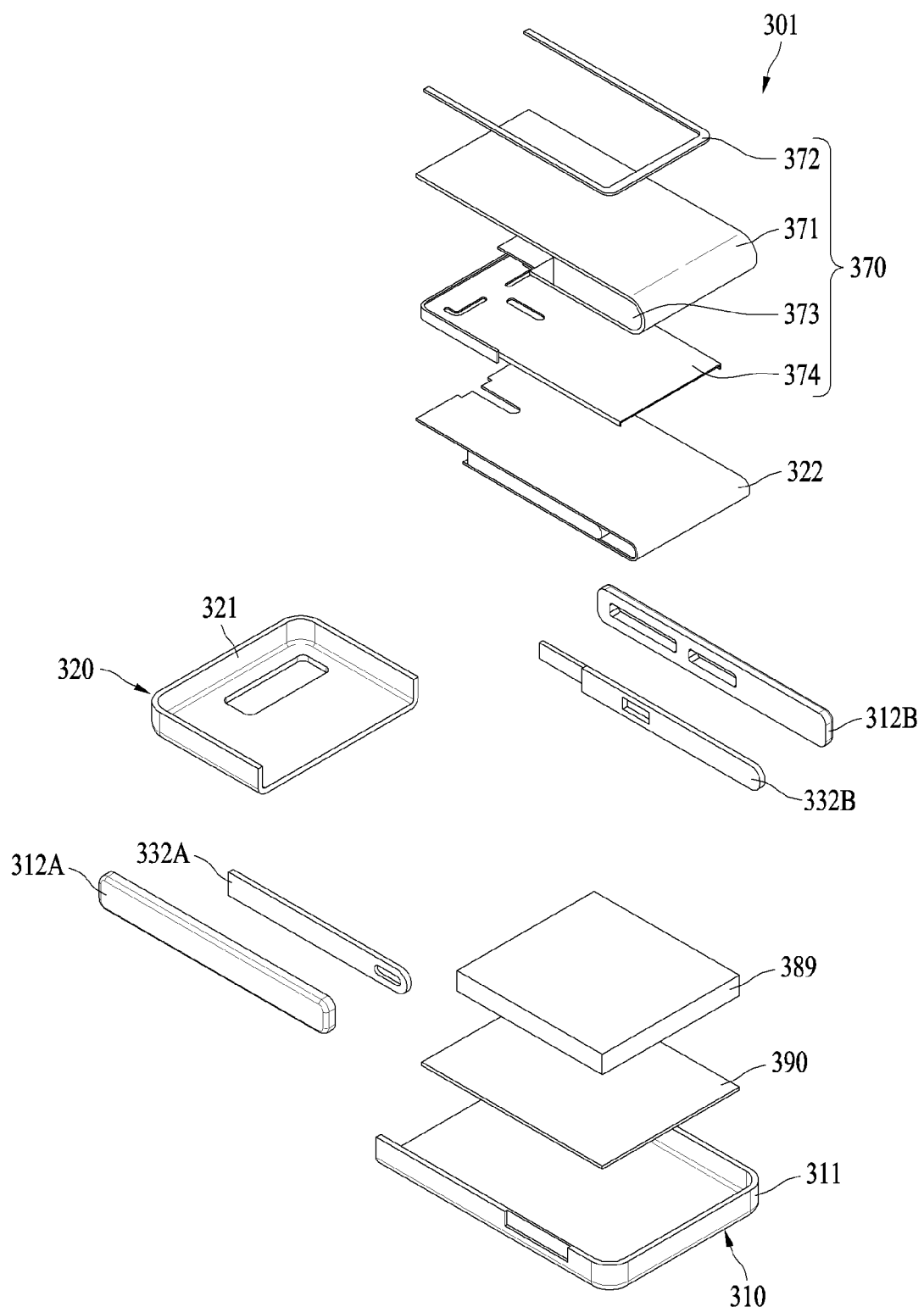
FIG. 3D is an exploded perspective view of an electronic device according to an embodiment of the disclosure.

FIG. 3D is an exploded perspective view of an electronic device according to an embodiment of the disclosure.

Referring to FIGS. 3A to 3D, an electronic device 301 (e.g., an electronic device 200 of FIGS. 2A to 2D) according to an embodiment may include a main body 390, a first housing 310 (e.g., the first housing 210 of FIGS. 2A to 2D), and a second housing 320 (e.g., the second housing 220 of FIGS. 2A to 2D). The main body 390 and the first housing 310 may be connected to be fixed to each other. The first housing 310 and the second housing 320 may be configured to move relative to each other. For example, the second housing 320 may move to the first housing 310 in a first direction (e.g., a +Y direction) or a second direction (e.g., a −Y direction). In this disclosure, a state in which the second housing 320 is completely inserted into the first housing 310 is referred to as a closed state (see FIG. 3A), and a state in which the second housing 320 completely protrudes from the first housing 310 is referred to as an open state (see FIG. 3C). The electronic device 301 may have a shape that changes between the open state and the closed state.

In an embodiment, the main body 390 may support at least one first electronic component. For example, the first electronic component may include the actuator 330, a battery 389 (e.g., the battery 189), and/or other electronic components. The main body 390 may support a first PCB 351 on which at least one of the first electronic components is disposed or to which at least one of the first electronic components is connected.

In an embodiment, the first housing 310 may include a first cover 311, a first side member 312A connected, linked, or coupled to any one side surface of the first cover 311, and a second side member 312B connected, linked, or coupled to another side surface of the first cover 311.

In an embodiment, the second housing 320 may support at least one of second electronic components. For example, a second electronic component may include a speaker module 355 (e.g., the sound output module 155), a camera module 380 (e.g., the camera module 180), and/or other electronic components. The second housing 320 may support a second PCB 352, on which at least one of the second electronic components is disposed or to which at least one of the second electronic components is connected. A processor (not shown) may be disposed on the second PCB 352.

In an embodiment, in FIG. 3D, the first electronic component and the second electronic component are not shown.

In an embodiment, the second housing 320 may include a second cover 321 and a plate 322 at least partially disposed on the second cover 321 and configured to support a display module 370 and/or protect the electronic components disposed in the first housing 310 and/or the second housing 320.

In an embodiment, the electronic device 301 may include the display module 370 (e.g., the display module 160 of FIG. 1). The display module 370 may include a flexible display 371 at least partially wound or rolled, an edge member 372 at least partially overlapping a periphery portion of the display 371, a support joint structure 373 configured to support the winding or rolling of the display 371, and a display plate 374 configured to support the support joint structure 373 and/or the display 371.

In an embodiment, the electronic device 301 may include a first rail 332A disposed between the first cover 311 and the first side member 312A and connected to a first side of the display 371 to expand or reduce an area of the display 371, and a second rail 332B disposed between the first cover 311 and the second side member 312B and connected to a second side opposite to the first side of the display 371 to expand or reduce the area of the display 371.

In an embodiment, the electronic device 301 may include a connecting assembly 340 configured to connect at least one of the first electronic components to at least one of the second electronic components. For example, the connecting assembly 340 may electrically connect at least one of the first electronic components (e.g., the actuator 330 and/or the battery 389) disposed on the first PCB 351 or connected to the first PCB 351 to at least one of the second electronic components (e.g., the speaker module 355 and/or the camera module 380) disposed on the second PCB 352 or connected to the second PCB 352, by connecting the first PCB 351 to the second PCB 352.

In an embodiment, the connecting assembly 340 may include a first portion 341 connected to the first PCB 351, a second portion 342 connected to the second PCB 352, and a third portion 343 between the first portion 341 and the second portion 342.

In an embodiment, the first portion 341 may include a first connector area 341A configured to be connected to the first PCB 351, and a first base area 341B configured to connect the first connector area 341A to the third portion 343. In an embodiment, the first connector area 341A and the first base area 341B may be oriented in directions that intersect (e.g., are orthogonal) with each other. In an embodiment, the first connector area 341A and the first base area 341B may be bent with respect to each other. For example, the first connector area 341A and/or the first base area 341B may be at least partially formed of a flexible material. In an embodiment, the first base area 341B may be substantially planar.

In an embodiment, the second portion 342 may include a second connector area 342A configured to be connected to the second PCB 352, and a second base area 342B configured to connect the second connector area 342A to the third portion 343. In an embodiment, the second connector area 342A and the second base area 342B may be oriented in directions that intersect (e.g., are orthogonal) with each other. In an embodiment, the second connector area 342A and the second base area 342B may be bent with respect to each other. For example, the second connector area 342A may be at least partially formed of a flexible material and the second base area 342B may be at least partially formed of a rigid material. In an embodiment, the second base area 342B may have a plurality of folding areas connected to each other to be foldable.

In an embodiment, the connecting assembly 340 may have a shape that varies depending on a change in the state of the electronic device 301. For example, in the open state in which the second housing 320 is completely moved to the first housing 310 in a first direction (e.g., the +Y direction), the connecting assembly 340 may be provided in a unfolded form in which one surface (e.g., an inner side surface) of the third portion 343 is unfolded such that at least some areas of the surface thereof are spaced apart from each other in an outward direction and substantially do not face each other. In another example, in the closed state in which the second housing 320 is completely moved to the first housing 310 in a second direction (e.g., the −Y direction), the connecting assembly 340 may be provided in a folded form in which one surface (e.g., the inner side surface) of the third portion 343 is unfolded such that at least some areas of the surface thereof become close to each other in an inward direction and substantially face each other.

In an embodiment, the electronic device 301 may include a guide structure 360 configured to guide at least a portion of the connecting assembly 340 to substantially and constantly maintain the folded form of the connecting assembly 340, when the state changes from the open state to the closed state. The guide structure 360 may be configured to, for example, guide the connecting assembly 340 such that the connecting assembly 340 has a substantially constant radius of curvature in the folded form, thereby reducing or preventing an effect (e.g., cracks) that may occur on the connecting assembly 340 due to the repeated driving of the electronic device 301 between the open state and the closed state.

Moreover, in this disclosure, the connecting assembly 340 is described as a component distinguished from the guide structure 360, but is not limited thereto, and the connecting assembly 340 may include the guide structure 360. For example, the connecting assembly 340 may include a flexible PCB including the components of the connecting assembly 340 described above and the guide structure 360 disposed on the flexible PCB. In an embodiment, the flexible PCB and the guide structure 360 may be integrally and seamlessly formed. In an embodiment, the flexible PCB and the guide structure 360 may be connected, linked, and/or coupled to each other.

The electronic device 301 according to an embodiment may include a contact member P disposed in the first housing 310 and a pressure sensor S disposed in the second housing 320. The contact member P may be maintained in contact with the pressure sensor S. For example, the contact member P may be formed of an elastic material. For example, the contact member P may be pressed by the pressure sensor S and may be provided with at least a portion that is in a compressively deformed state.

The pressure sensor S may sense pressure applied by the contact member P. The pressure sensor S may transmit sensed information to a processor (not shown) (e.g., the processor 120 of FIG. 1). For example, the processor may be disposed on the second PCB 352. The pressure sensor S may have a shape that is long in a Y-axis direction. The pressure sensor S may detect a position at which pressure is applied and/or an intensity of the pressure.

In an embodiment, the pressure sensor S may include at least one of a strain gauge pressure sensor, a capacitive pressure sensor, a potentiometric pressure sensor, a linear variable differential transformer (LVDT) pressure sensor, a piezoelectric pressure sensor, a silicon pressure sensor, or an optical pressure sensor.

In an embodiment, the processor may control the actuator 330 based on pressure information sensed by the pressure sensor S. For example, when the intensity of the pressure sensed by the pressure sensor S exceeds a predetermined threshold intensity, the processor may recognize the pressure as a trigger signal. When the trigger signal is input, the processor may control the actuator 330 to implement a relative movement of the first housing 310 and the second housing 320.

In an embodiment, the processor may determine state information of the electronic device 301, based on a position of the pressure sensed by the pressure sensor S. For example, the processor may determine whether the electronic device 301 is in the open state, whether the electronic device 301 is in the closed state, or whether the electronic device 301 is in a state other than the open state and the closed state, based on the position of the pressure sensed by the pressure sensor S. For example, the processor may determine whether the electronic device 301 is in a state relatively close to the open state or whether the electronic device 301 is in a state relatively close to the closed state. The processor may control the actuator 330 to change the state of the electronic device 301 when the intensity of the pressure sensed by the pressure sensor S exceeds the threshold intensity.

Figure 4A:
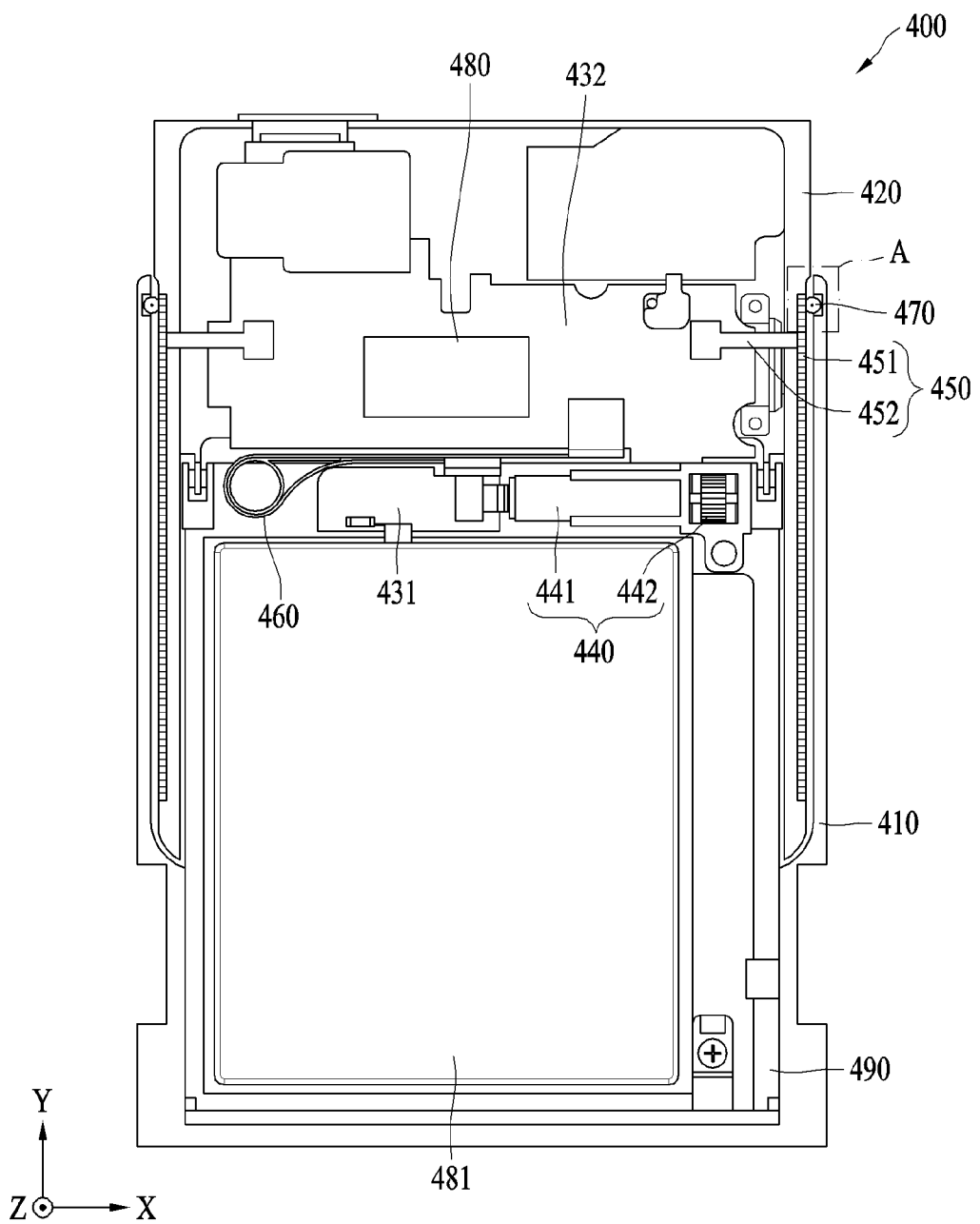
FIG. 4A is a diagram schematically illustrating an electronic device in a closed state according to an embodiment of the disclosure.

FIG. 4A is a diagram schematically illustrating an electronic device in a closed state according to an embodiment of the disclosure.

Figure 4B:
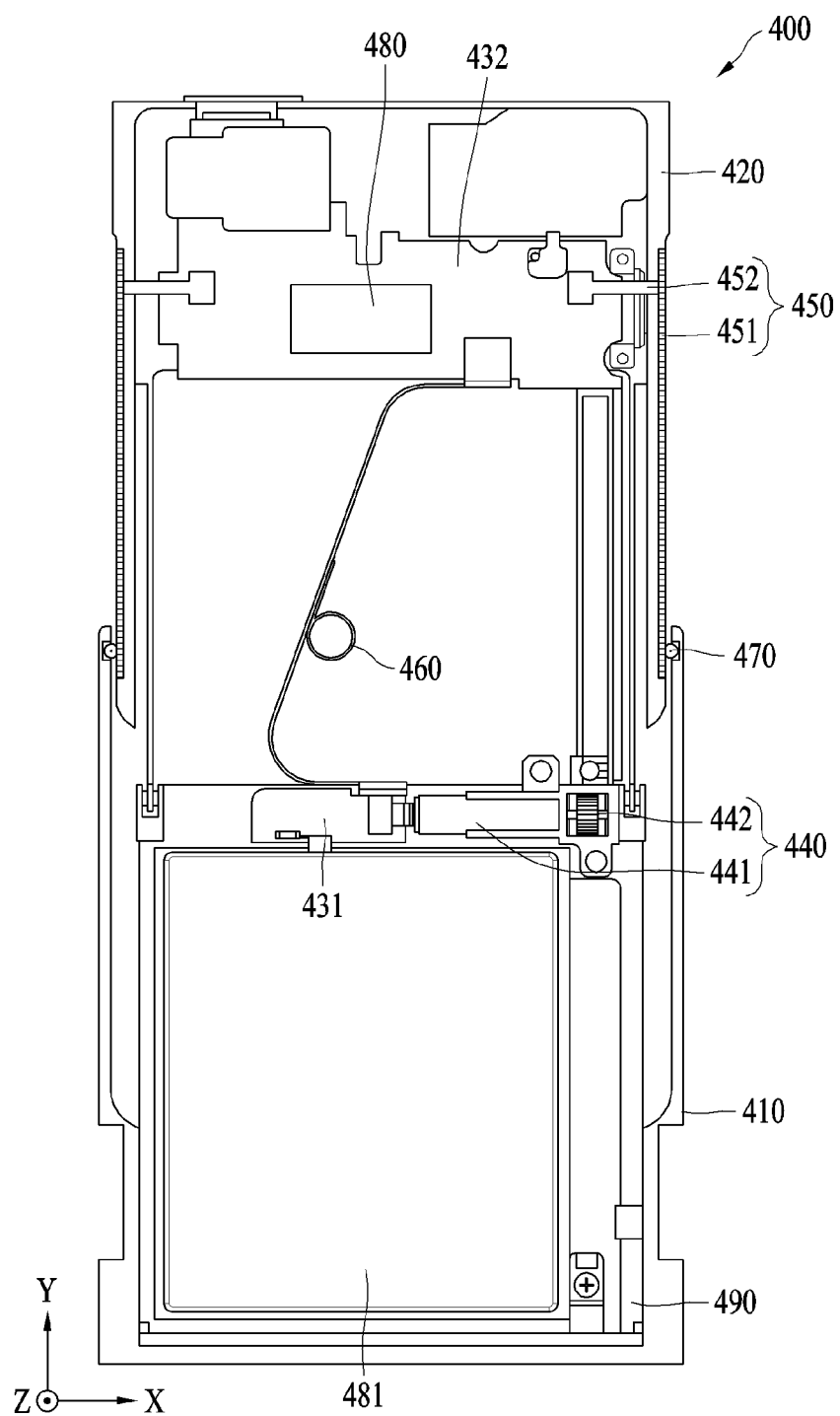
FIG. 4B is a diagram schematically illustrating an electronic device in an open state according to an embodiment of the disclosure.

FIG. 4B is a diagram schematically illustrating an electronic device in an open state according to an embodiment of the disclosure.

Figure 4C:
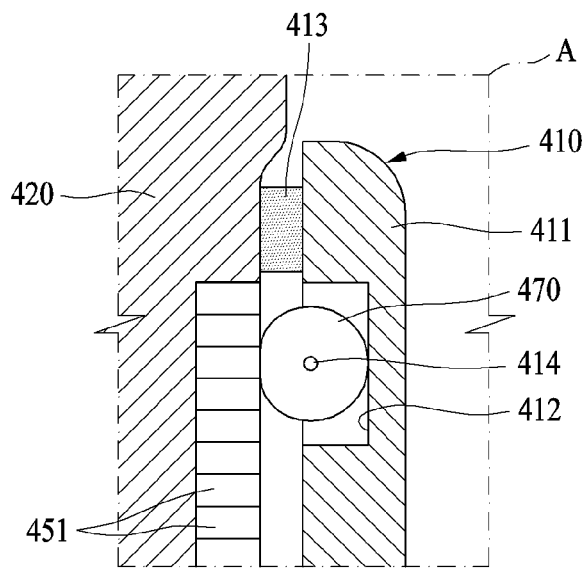
FIG. 4C is a cross-sectional view partially enlarging a portion A of FIG. 4A according to an embodiment of the disclosure.

FIG. 4C is a cross-sectional view partially enlarging a portion A of FIG. 4A according to an embodiment of the disclosure.

Referring to FIGS. 4A to 4C, an electronic device 400 (e.g., the electronic device 101 of FIG. 1) according to an embodiment may be a slidable mobile device including a flexible display (e.g., the display 371 of FIG. 3D). The electronic device 400 may have a function of a button for sensing sliding and controlling the sliding automatically. The electronic device 400 according to an embodiment may include a main body 490, a first housing 410 (e.g., the first housing 310 of FIGS. 3A to 3D), and a second housing 420 (e.g., the second housing 320 of FIGS. 3A to 3D). The main body 490 and the first housing 410 may be connected to each other to be fixed to each other. The first housing 410 and the second housing 420 may be configured to move relative to each other. For example, the second housing 420 may move to the first housing 410 in a first direction (e.g., a +Y direction) or a second direction (e.g., a −Y direction). In this disclosure, a state in which the second housing 420 is completely inserted into the first housing 410 is referred to as a closed state (see FIG. 4A) and a state in which the second housing 420 completely protrudes from the first housing 410 is referred to as an open state (see FIG. 4D).

In an embodiment, the electronic device 400 may include a contact member 470 disposed in the first housing 410, a pressure sensor 450 disposed in the second housing 420, a battery 481 (e.g., the battery 389 of FIG. 3A) disposed on the main body 490, a first PCB 431 (e.g., the first PCB 351 of FIG. 3A) disposed on the main body 490, a second PCB 432 (e.g., the second PCB 352 of FIG. 3A) disposed in the second housing 420, an actuator 440 (e.g., the actuator 330 of FIG. 3A) for implementing a relative movement of the first housing 410 and the second housing 420, a connecting assembly 460 (e.g., the connecting assembly 340 of FIG. 3A) for physically and electrically connecting the first PCB 431 and the second PCB 432 to each other, and a processor 480 (e.g., the processor 120 of FIG. 1) disposed on the second PCB 432.

In this disclosure, the first PCB 431 and the second PCB 432 may also be referred to as the PCB.

In an embodiment, the main body 490 may support electronic components. For example, the main body 490 may support the battery 481. The main body 490 may be provided in a fixed state to the first housing 410 that is directly grabbed with the user's hand. While the second housing 420 slides relative to the first housing 410, the main body 490 may be provided in a fixed state to the first housing 410.

In an embodiment, the first housing 410 may cover the main body 490. The first housing 410 has a hollow therein and may accommodate the main body 490 in the hollow. At least a portion of an inner side surface of the first housing 410 may be spaced apart from the main body 490 in an X-axis direction. A space for the sliding of the second housing 420 may be provided between the first housing 410 and the main body 490.

In an embodiment, the first housing 410 may include a housing body 411 covering at least a portion of the second housing 420, a pad groove 412 recessed from an inner surface of the housing body 411 that faces the pressure sensor 450, and a support shaft 414 supporting the contact member 470. The electronic device 400 may include a sweeper 413 disposed in the first housing 410.

In an embodiment, the sweeper 413 may include a material that elastically deforms. For example, the sweeper 413 may include rubber, silicone, polymer, and/or metal. For example, the sweeper 413 may include a leaf spring.

In an embodiment, the pad groove 412 may accommodate at least a portion of the contact member 470. The sweeper 413 may be provided in a compressively deformed state by a plurality of channels 451 of the second housing 420 or the pressure sensor 450. The sweeper 413 may be provided at a position spaced apart from the contact member 470. The sweeper 413 may be spaced apart from the contact member 470 in the +Y direction, for example. The sweeper 413 may have a width greater than that of the contact member 470 in the Z-axis direction. The sweeper 413 may block moisture and/or foreign materials not to enter the space between the first housing 410 and the second housing 420. The support shaft 414 may support the contact member 470 in a fixed state or may rotatably support the contact member 470.

In an embodiment, the second housing 420 may slide relative to the first housing 410. The second housing 420 may slide in a direction in which the second housing 420 protrudes from the first housing 410 (e.g., the +Y direction) or may slide in a direction in which the second housing 420 is inserted into the first housing 410 (e.g., the −Y direction). At least a portion of the second housing 420 may be provided in a state of being inserted between the first housing 410 and the main body 490. The second housing 420 may support electronic components. For example, the second housing 420 may support a speaker module and/or a camera module.

In an embodiment, the actuator 440 may implement a relative movement of the first housing 410 and the second housing 420. For example, the actuator 440 may transfer power to the second housing 420 while being disposed in the first housing 410. The actuator 440 may drive the second housing 420. For example, the actuator 440 may include a driving motor 441 and a driving wheel 442 connected to an output terminal of the driving motor 441 to be driven. The driving wheel 442 may be connected to the second housing 420 to transfer power to the second housing 420. In the disclosure, it is described that the actuator 440 is disposed in the first housing 410 and transfers power to the second housing 420, but there is no limitation thereto. For example, the actuator 440 may be disposed in the second housing 420 and transfer power to the first housing 410.

In an embodiment, the pressure sensor 450 may sense pressure. The pressure sensor 450 may detect a position to which the pressure is applied or may sense an intensity of the pressure. The pressure sensor 450 may be disposed in the second housing 420 to face the contact member 470. The pressure sensor 450 may have a long shape. The pressure sensor 450 may include the plurality of channels 451 arranged side-by-side in a sliding direction of the second housing 420, and a sensor connector 452 for connecting the plurality of channels 451 to the second PCB 432. The pressure sensor 450 may sense pressure by using the plurality of channels 451. As the number of channels 451 increases, the resolution of the pressure sensor 450 may increase. In other words, as the number of channels 451 increases, the position recognition ability of the pressure sensor 450 may increase.

In an embodiment, a pair of pressure sensors 450 may be provided on opposite sides with respect to the second housing 420. One pressure sensor of the pair of pressure sensors 450 may be disposed on a surface of the second housing 420 facing the +X direction, and the other pressure sensor may be disposed on a surface of the second housing 420 facing the −X direction. The pair of pressure sensors 450 may sense pressures different from each other. For example, an intensity of the pressure sensed by one pressure sensor may be different from an intensity of the pressure sensed by the other pressure sensor. The processor 480 may receive pressure information sensed by the pair of pressure sensors 450, and generate a control signal based on the information.

In an embodiment, each of the plurality of channels 451 may sense pressure. Pressure information sensed by the plurality of channels 451 may be transferred to the processor 480 disposed on the second PCB 432 via the sensor connector 452.

In an embodiment, the sensor connector 452 may connect the plurality of channels 451 to the second PCB 432. One end of the sensor connector 452 may be connected to the plurality of channels 451, and the other end of the sensor connector 452 may be connected to the second PCB 432. The sensor connector 452 may include a PCB and a plurality of wires (not shown) disposed on the PCB and connected to channels, respectively. The PCB of the sensor connector 452 may be, for example, a flexible PCB.

In an embodiment, the contact member 470 may be disposed in the first housing 410. The contact member 470 may be disposed to face the pressure sensor 450. The contact member 470 may apply a force to the pressure sensor 450. At least a portion of the contact member 470 may be formed of an elastically deformable material and may be provided in a compressively deformed state by the pressure sensor 450. The contact member 470 may be provided in a fixed state to the first housing 410 or may be provided to be movable relative to the first housing 410. For example, while the second housing 420 slides, the contact member 470 may be fixed to the first housing 410 and maintain its shape. In another example, while the second housing 420 slides, the contact member 470 may rotate relative to the first housing 410.

In an embodiment, the processor 480 may be disposed on the first PCB 431 and/or the second PCB 432. In the disclosure, it is described that the processor 480 is disposed on the second PCB 432, but there is no limitation thereto. For example, the processor 480 may be provided in a state of being disposed on the first PCB 431.

In an embodiment, the processor 480 may control a plurality of electronic components. The processor 480 may be electrically connected to the pressure sensor 450 and the actuator 440. The processor 480 may control the actuator 440 based on the pressure information sensed by the pressure sensor 450. The processor 480 may drive the actuator 440 when an intensity of the pressure sensed by any one channel among the plurality of channels 451 is greater than an intensity of the predetermined pressure. For example, when the intensity of the pressure sensed by the pressure sensor 450 exceeds the intensity of the predetermined pressure, the processor 480 may recognize the pressure as a trigger signal and drive the actuator 440.

In an embodiment, the actuator 440 controlled by the processor 480 may switch the state of the second housing 420 from the closed state to the open state, or may switch the state of the second housing 420 from the open state to the closed state. The user may automatically switch the state of the second housing 420 by pressing both sides of the first housing 410, rather than directly grabbing and lifting the second housing 420. The user may switch the state of the second housing 420 only by applying a force with the knuckle while using the electronic device 400.

For example, when the second housing 420 is in the closed state and the intensity of the pressure sensed by the pressure sensor 450 is greater than the intensity of the predetermined pressure, the processor 480 may control the actuator 440 and the actuator 440 may drive the second housing 420 to switch the state of the second housing 420 to the open state. For example, when the second housing 420 is in the open state and the intensity of the pressure sensed by the pressure sensor 450 is greater than the intensity of the predetermined pressure, the processor 480 may control the actuator 440 and the actuator 440 may drive the second housing 420 to switch the state of the second housing 420 to the closed state.

In an embodiment, the processor 480 may detect a position of a channel in the plurality of channels 451 where the pressure is sensed and may detect a position of the second housing 420 with respect to the first housing 410. For example, the processor 480 may determine how much the second housing 420 protrudes relative to the first housing 410, based on the position where the pressure is sensed. For example, the second housing 420 may be provided in the closed state in which the second housing 420 is completely inserted into the first housing 410, the open state in which the second housing 420 completely protrudes from the first housing 410, or an arbitrary state between the closed state and the open state.

For example, the processor 480 may determine a current state of the second housing 420, based on the pressure information measured by the pressure sensor 450. For example, the pressure sensor 450 may have a long shape in the Y-axis direction. When the pressure is sensed at a +Y side end portion of the pressure sensor 450, the processor 480 may recognize that the second housing 420 is in the closed state. When the pressure is sensed at a −Y side end portion of the pressure sensor 450, the processor 480 may recognize that the second housing 420 is in the open state. The pressure sensor 450 may include a plurality of channels 451 arranged side-by-side in the Y-axis direction. As the number of channels 451 increases, the position recognition accuracy of the processor 480 may increase.

In an embodiment, the first PCB 431 may be disposed in the second housing 420. The first PCB 431 may be electrically connected to the battery 481, the actuator 440, and/or the connecting assembly 460. The first PCB 431 may be electrically connected to the second PCB 432 via the connecting assembly 460.

In an embodiment, the second PCB 432 may be disposed in the second housing 420. The second PCB 432 may support the processor 480. The processor 480 may be electrically connected to the actuator 440 via the second PCB 432, the connecting assembly 460, and the first PCB 431.

In an embodiment, the connecting assembly 460 may connect the first PCB 431 to the second PCB 432.

Figure 5A:
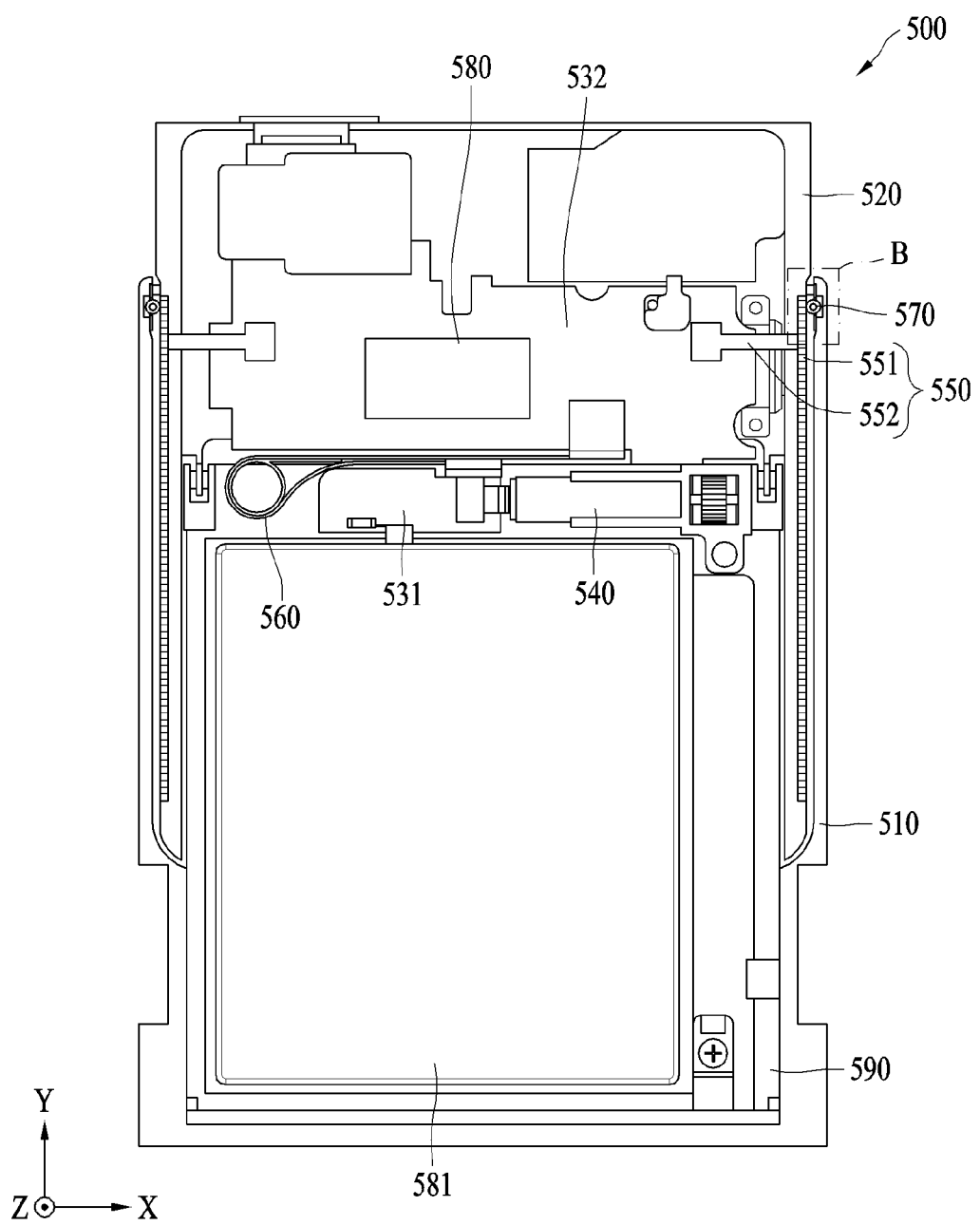
FIG. 5A is a diagram schematically illustrating an electronic device in a closed state according to an embodiment of the disclosure.

FIG. 5A is a diagram schematically illustrating an electronic device in a closed state according to an embodiment of the disclosure.

Figure 5B:
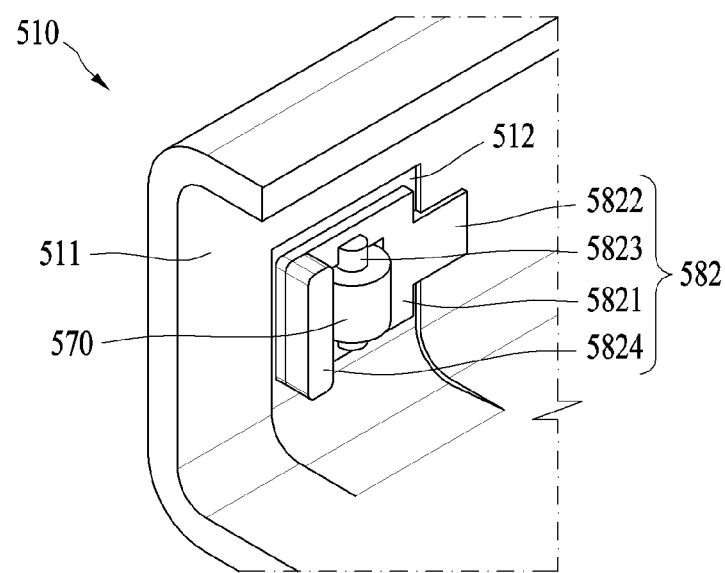
FIG. 5B is a perspective view schematically illustrating a portion B of FIG. 5A according to an embodiment of the disclosure.

FIG. 5B is a perspective view schematically illustrating a portion B of FIG. 5A according to an embodiment of the disclosure.

Figure 5C:
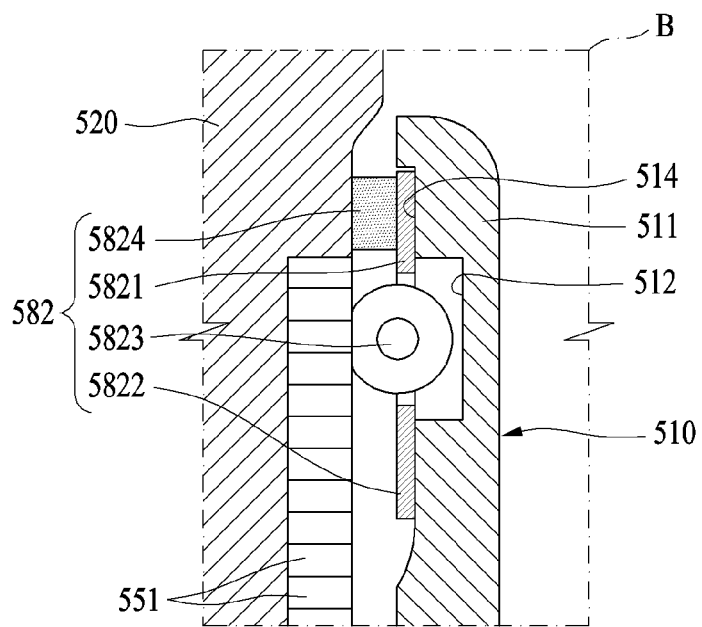
FIG. 5C is a cross-sectional view partially enlarging a portion B of FIG. 5A according to an embodiment of the disclosure.

FIG. 5C is a cross-sectional view partially enlarging the portion B of FIG. 5A according to an embodiment of the disclosure.

Figure 5D:
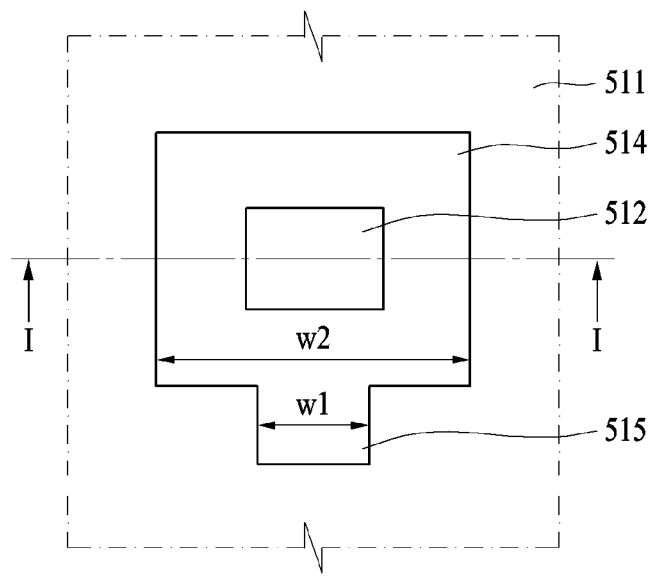
FIG. 5D is a plan view illustrating an inner surface of a second housing according to an embodiment of the disclosure.

FIG. 5D is a plan view illustrating an inner surface of a second housing according to an embodiment of the disclosure.

Figure 5E:
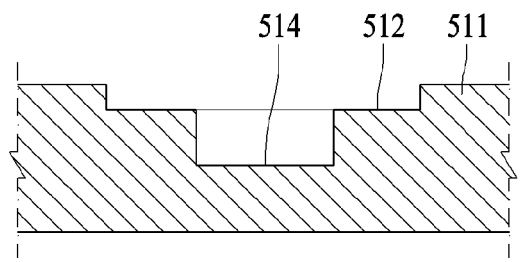
FIG. 5E is a cross-sectional view taken along a line I-I of FIG. 5D according to an embodiment of the disclosure.

FIG. 5E is a cross-sectional view taken along a line I-I of FIG. 5D according to an embodiment of the disclosure.

Referring to FIGS. 5A to 5E, an electronic device 500 (e.g., the electronic device 101 of FIG. 1) according to an embodiment may be a slidable mobile device including a flexible display (e.g., the display 371 of FIG. 3D). The electronic device 500 may have a function of a button for sensing sliding and controlling the sliding automatically. The electronic device 500 according to an embodiment may include a main body 590, a first housing 510, a second housing 520, a first PCB 531, a second PCB 532, an actuator 540, a pressure sensor 550, a connecting assembly 560, a contact member 570, a processor 580, and a battery 581. The pressure sensor 550 may include a plurality of channels 551 and a sensor connector 552. The electronic device 500 may include a support 582 disposed in the first housing 510 and supporting the contact member 570.

In an embodiment, since the support 582 is a separate component distinct from the first housing 510, the user may easily repair and/or replace the contact member 570 by replacing the support 582. For example, the support 582 may be detachable from the first housing 510. The user may repair and/or replace the contact member 570 when the support 582 is separated from the first housing 510.

In an embodiment, the support 582 may include a main support plate 5821, a sub-support plate 5822, and a support shaft 5823. A sweeper 5824 may be disposed on the main support plate 5821. The main support plate 5821 may support the support shaft 5823. For example, both ends of the support shaft 5823 may be fixed to the main support plate 5821. The sub-support plate 5822 may be formed to extend from the main support plate 5821. The sub-support plate 5822 may have a width that is less than that of the main support plate 5821. The support shaft 5823 may rotatably support the contact member 570. The contact member 570 may rotate relative to the main support plate 5821 and/or the first housing 510.

In an embodiment, in a case where the relative movement between the first housing 510 and the second housing 520 is repeated, the performance of the contact member 570 and/or the sweeper 5824 may deteriorate. The user may easily perform maintenance of the contact member 570 and/or the sweeper 5824 when the support 582 is separated from the first housing 510.

In an embodiment, the first housing 510 may include a housing body 511, plate grooves 514 and 515 recessed from an inner surface of the housing body 511 facing the pressure sensor 550, and a pad groove 512 recessed from the inner surface and having a depth that is deeper than those of the plate grooves 514 and 515. The plate grooves 514 and 515 may include a first plate groove 514 accommodating the main support plate 5821 and a second plate groove 515 accommodating the sub-support plate 5822. A width w1 of the second plate groove 515 may be less than a width w2 of the first plate groove 514. The user may easily couple the support 582 to the first housing 510 by fitting the sub-support plate 5822 to the second plate groove 515.

Figure 6A:
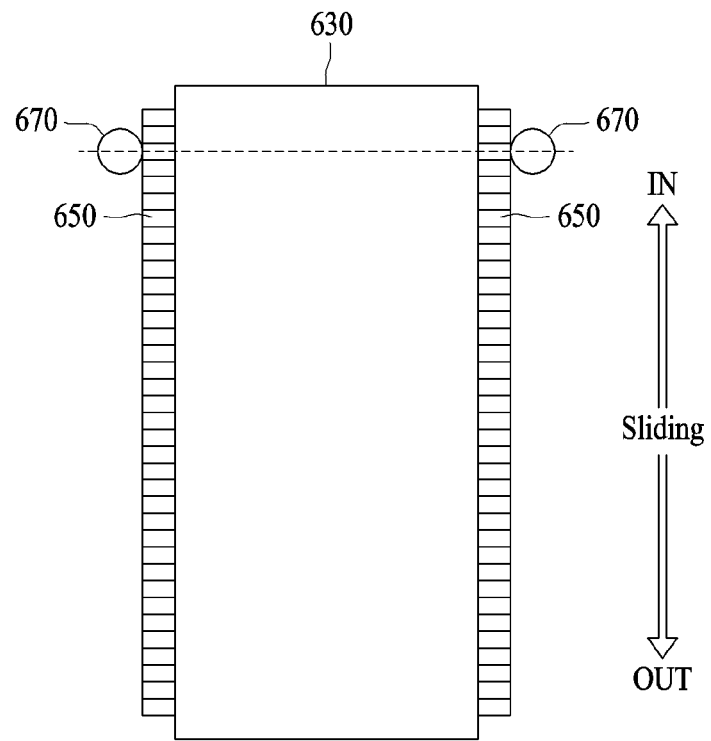
FIG. 6A is a diagram schematically illustrating an electronic device according to an embodiment of the disclosure.

FIG. 6A is a diagram schematically illustrating an electronic device according to an embodiment of the disclosure.

Figure 6B:
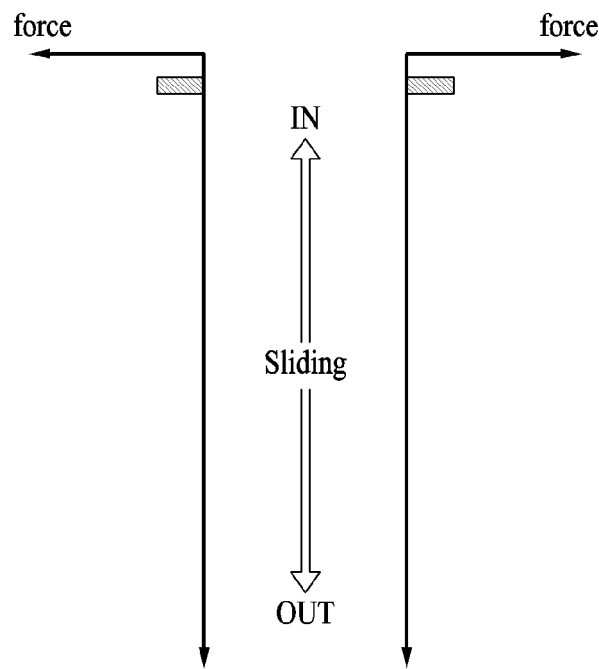
FIG. 6B is a diagram schematically illustrating a force sensed by a pressure sensor in FIG. 6A according to an embodiment of the disclosure.

FIG. 6B is a diagram schematically illustrating a force sensed by a pressure sensor in FIG. 6A according to an embodiment of the disclosure.

Figure 6C:
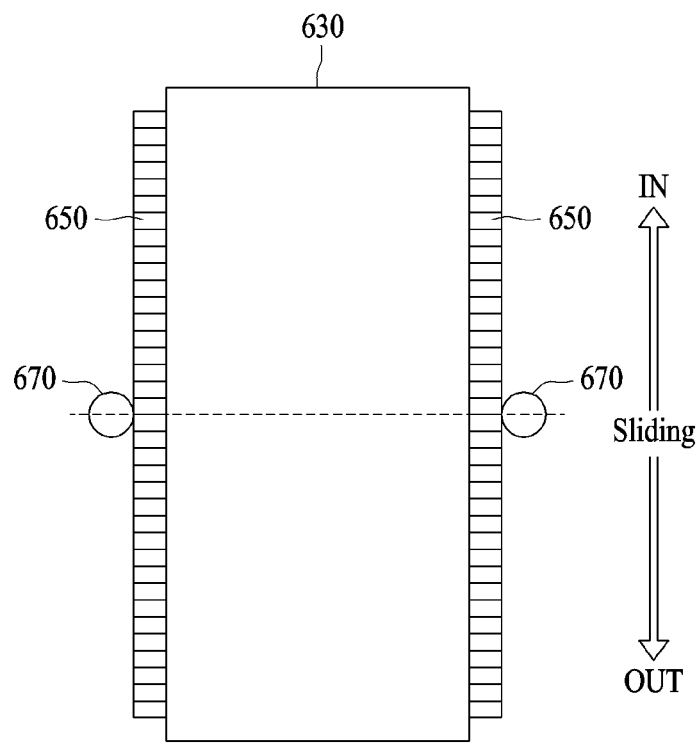
FIG. 6C is a diagram schematically illustrating an electronic device according to an embodiment of the disclosure.

FIG. 6C is a diagram schematically illustrating an electronic device according to an embodiment of the disclosure.

Figure 6D:
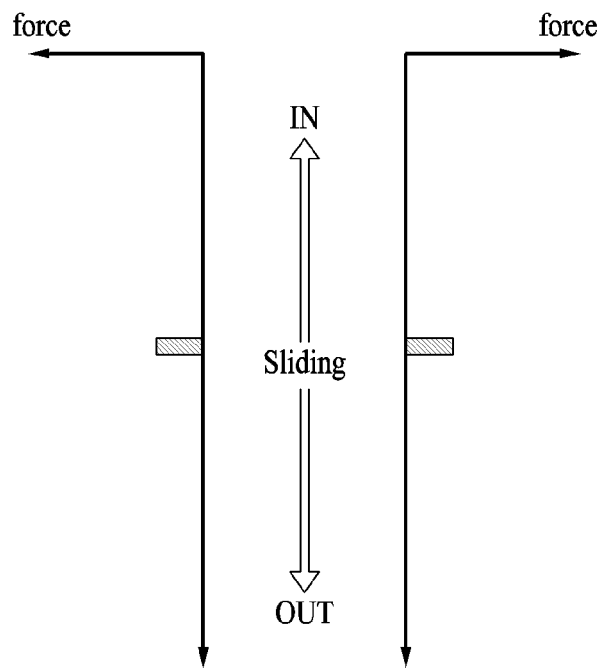
FIG. 6D is a diagram schematically illustrating a force sensed by a pressure sensor in FIG. 6C according to an embodiment of the disclosure.

FIG. 6D is a diagram schematically illustrating a force sensed by a pressure sensor in FIG. 6C according to an embodiment of the disclosure.

Figure 6E:
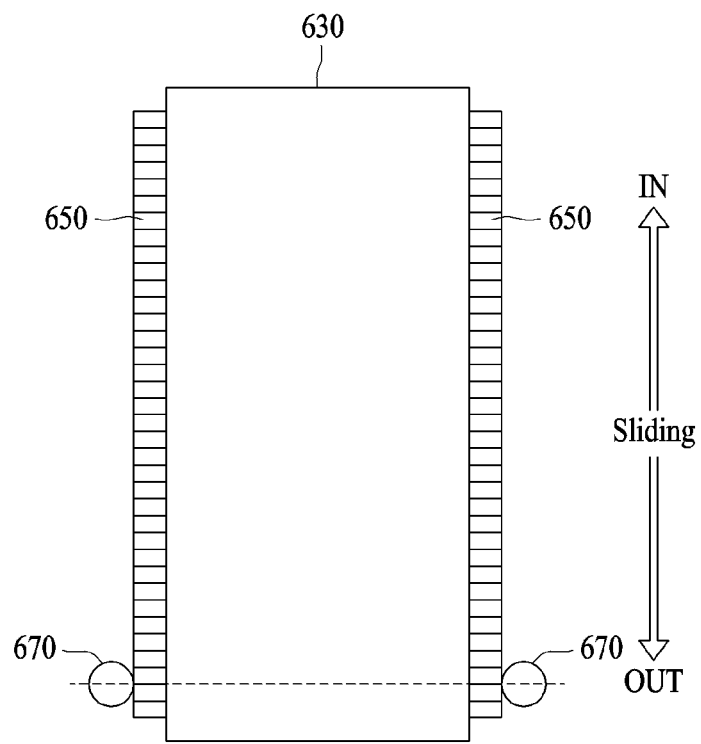
FIG. 6E is a diagram schematically illustrating an electronic device according to an embodiment of the disclosure.

FIG. 6E is a diagram schematically illustrating an electronic device according to an embodiment of the disclosure.

Figure 6F:
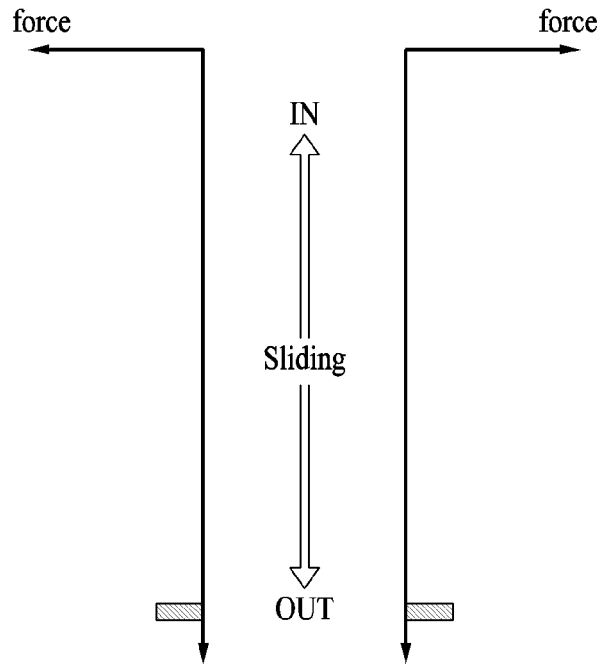
FIG. 6F is a diagram schematically illustrating a force sensed by a pressure sensor in FIG. 6E according to an embodiment of the disclosure.

FIG. 6F is a diagram schematically illustrating a force sensed by a pressure sensor in FIG. 6E according to an embodiment of the disclosure.

Referring to FIGS. 6A to 6F, a pressure sensor 650 may be disposed in a second housing 630, and a contact member 670 may slide relative to the second housing 630. Sliding directions of the contact member 670 are shown as "IN" and "OUT". Here, "OUT" refers to a moving direction of the contact member 670 when the second housing 630 protrudes outwardly from the first housing (not shown). In addition, "IN" refers to a moving direction of the contact member 670 when the second housing 630 is inserted into the first housing (not shown). While the contact member 670 slides along the pressure sensor 650, the pressure sensor 650 may sense force or pressure. A processor (e.g., the processor 480 of FIG. 4A) may recognize a position of the second housing 630 with respect to the first housing by using the force or pressure sensed by the pressure sensor 650.

Figure 7A:
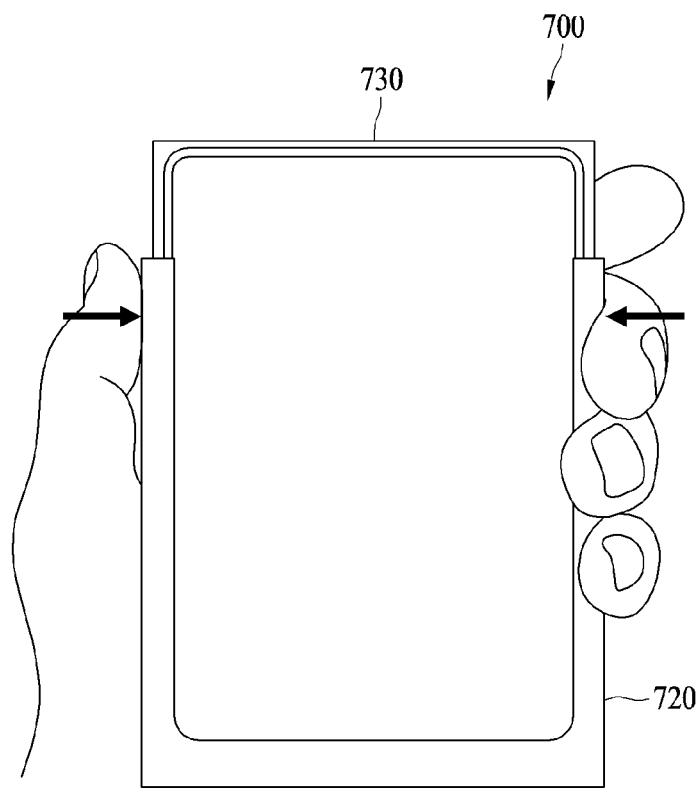
FIG. 7A is a diagram schematically illustrating a state in which an electronic device is grabbed with a user's hand according to an embodiment of the disclosure.

FIG. 7A is a diagram schematically illustrating a state in which an electronic device is grabbed with a user's hand according to an embodiment of the disclosure.

Figure 7B:
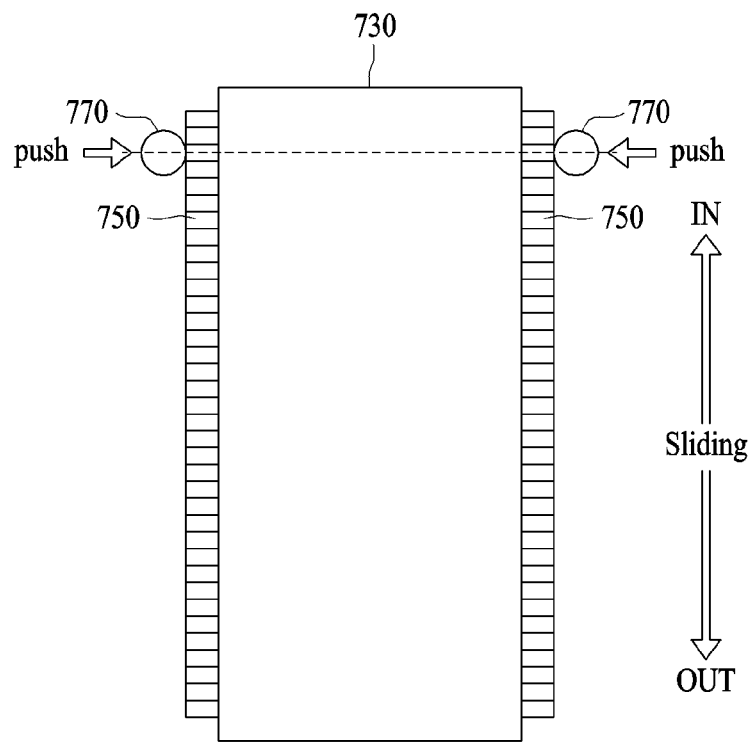
FIG. 7B is a diagram schematically illustrating an electronic device according to an embodiment of the disclosure.

FIG. 7B is a diagram schematically illustrating an electronic device according to an embodiment of the disclosure.

Figure 7C:
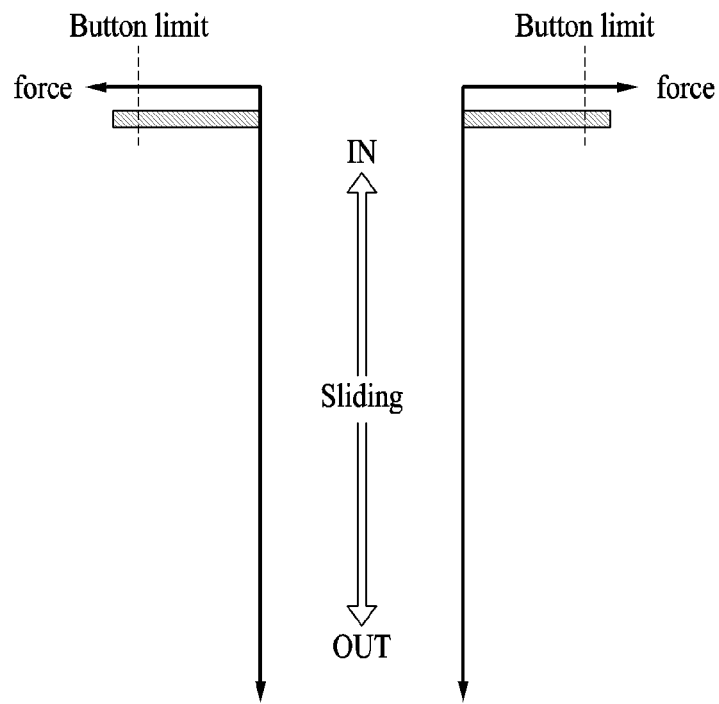
FIG. 7C is a diagram schematically illustrating a force sensed by a pressure sensor in FIG. 7B according to an embodiment of the disclosure.

FIG. 7C is a diagram schematically illustrating a force sensed by a pressure sensor in FIG. 7B according to an embodiment of the disclosure.

Referring to FIGS. 7A to 7C, the user may naturally grab an electronic device 700 with the hand. The electronic device 700 may include a contact member 770, a pressure sensor 750, a first housing 720 grabbed with the user's hand, and a second housing 730 provided to be slidable relative to the first housing 720. When the force applied from the user's finger exceeds a predetermined force or pressure (referred to as Button limit in the drawing), a processor may recognize the force or pressure as a trigger signal for state switching.

An electronic device according to an embodiment includes a first housing 410, a second housing 420 slidable relative to the first housing, a contact member 470 disposed in the first housing, a pressure sensor 450 disposed in the second housing to face the contact member and provided in a state in which at least a portion of the pressure sensor is in contact with the contact member, a PCB disposed in the second housing, an actuator 440 configured to drive the second housing, and a processor 480 disposed on the PCB, electrically connected to the pressure sensor and the actuator, and configured to recognize a position of the second housing with respect to the first housing, and control the actuator to move the second housing relative to the first housing, when an intensity of pressure sensed by the pressure sensor is greater than an intensity of predetermined pressure.

According to an embodiment, the pressure sensor 450 may include a plurality of channels 451 arranged side-by-side in a sliding direction of the second housing and capable of sensing pressure, and a sensor connector 452 configured to connect the plurality of channels to the PCB.

According to an embodiment, the second housing 420 may be provided in a closed state in which the second housing is inserted into the first housing or an open state in which the second housing protrudes from the first housing.

According to an embodiment, the actuator may switch a state of the second housing from any one of the closed state and the open state to the other state.

According to an embodiment, when the second housing is in the closed state and the intensity of the pressure sensed by the pressure sensor is greater than the intensity of the predetermined pressure, the actuator 440 may switch the state of the second housing 420 to the open state.

According to an embodiment, when the second housing is in the open state and the intensity of the pressure sensed by the pressure sensor is greater than the intensity of the predetermined pressure, the actuator 440 may switch the state of the second housing 420 to the open state.

According to an embodiment, when the intensity of the pressure sensed by the pressure sensor is greater than the intensity of the predetermined pressure while the state of the second housing is switched from the closed state to the open state, the actuator 440 may stop the second housing 420 or switch the state of the second housing 420 to the closed state.

According to an embodiment, when the intensity of the pressure sensed by the pressure sensor is greater than the intensity of the predetermined pressure while the state of the second housing is switched from the open state to the closed state, the actuator 440 may stop the second housing 420 or switch the state of the second housing 420 to the open state.

According to an embodiment, the pressure sensor 450 may be provided as a pair, and the pair of pressure sensors 450 may be disposed opposite to each other with respect to the second housing.

According to an embodiment, at least a portion of the contact member 470 may be formed of an elastically deformable material and may be provided in a state of being compressively deformed by the pressure sensor 450.

According to an embodiment, the contact member may be rotatably disposed with respect to the first housing.

According to an embodiment, the electronic device may further include a support including a main support plate disposed in the first housing and a support shaft fixed to the main support plate and rotatably supporting the contact member.

According to an embodiment, the electronic device may further include a sweeper 413 provided in a state of being compressively deformed by the second housing or the pressure sensor and provided at a position spaced apart from the contact member in a sliding direction of the second housing.

According to an embodiment, the first housing 510 may include a housing body 511 covering at least a portion of the second housing, and a pad groove 512 recessed from an inner surface of the housing body that faces the pressure sensor, and accommodating at least a portion of the contact member.

According to an embodiment, the electronic device may further include a support 582 disposed on the housing body, and a support shaft supported by the support and rotatably supporting the contact member.

According to an embodiment, the first housing 510 may include a first plate groove 514 or a second plate groove 515 recessed from the inner surface of the housing body, accommodating at least a portion of the support, and having a depth that is less than a depth of the pad groove.

An electronic device according to an embodiment may include a first housing 510, a second housing 520 slidable relative to the first housing, a contact member 570 disposed in the first housing, a pressure sensor 550 disposed in the second housing to face the contact member and provided in a state in which at least a portion of the pressure sensor is in contact with the contact member, and a support 582 including a main support plate 5821 disposed in the first housing, and a support shaft 5823 fixed to the main support plate and rotatably supporting the contact member.

According to an embodiment, the pressure sensor may include a plurality of channels arranged side-by-side in a sliding direction of the second housing and capable of sensing pressure.

According to an embodiment, at least a portion of the contact member may be formed of an elastically deformable material and may be provided in a state of being compressively deformed by the pressure sensor.

According to an embodiment, the support may further include a sweeper disposed on the main support plate and provided in a state of being compressively deformed by the second housing or the pressure sensor.

An electronic device according to an embodiment may include a first housing 510, a second housing 520 slidable relative to the first housing, a contact member 570 disposed in the first housing, a pressure sensor disposed in the second housing to face the contact member and provided in a state in which at least a portion of the pressure sensor is in contact with the contact member, a support 582 including a main support plate 5821 disposed in the first housing, and a support shaft 5823 fixed to the main support plate and rotatably supporting the contact member, a PCB disposed in the second housing, an actuator 540 configured to drive the second housing, and a processor 580 disposed on the PCB, electrically connected to the pressure sensor and the actuator, and configured to recognize a position of the second housing with respect to the first housing, and control the actuator to move the second housing relative to the first housing, when an intensity of pressure sensed by the pressure sensor is greater than an intensity of predetermined pressure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing slidable relative to the first housing;
   a contact member disposed in the first housing;
   a pressure sensor disposed in the second housing, the pressure sensor facing the contact member and at least a portion of the pressure sensor contacting the contact member, the pressure sensor comprising a pair of pressure sensors disposed opposite to each other with respect to the second housing, wherein the pair of pressure sensors sense pressures different from each other;
   a printed circuit board (PCB) disposed in the second housing;
   an actuator configured to drive the second housing; and
   a processor disposed on the PCB and being electrically connected to the pressure sensor and the actuator, the processor being configured to:
      recognize a position of the second housing with respect to the first housing,
      in response to the pressure sensor sensing an intensity of pressure greater than an intensity of a predetermined pressure, control the actuator to move the second housing relative to the first housing, and
      in response to sensing pressure on both sides of the first housing in which at least one of the pair of pressure sensors senses pressure exceeding the predetermined pressure, automatically switch a state of the second housing from an open state, in which the second housing protrudes from the first housing, to a closed state, in which the second housing is inserted into the first housing, or from the closed state to the open state.

2. The electronic device of claim 1, wherein the pressure sensor comprises:
   a plurality of channels arranged side-by-side in a sliding direction of the second housing and configured to sense pressure; and
   a sensor connector configured to connect the plurality of channels to the PCB.

3. The electronic device of claim 2, wherein the second housing is configured to be in at least one of the closed state in which the second housing is inserted into the first housing or the open state in which the second housing protrudes from the first housing.

4. The electronic device of claim 3, wherein the actuator is configured to move the second housing from the closed state to the open state and from the open state to the closed state.

5. The electronic device of claim 3, wherein, based on the second housing being in the closed state and the intensity of the pressure sensed by the pressure sensor being greater than the intensity of the predetermined pressure, the actuator is configured to move the second housing to the open state.

6. The electronic device of claim 3, wherein, based on the second housing being in the open state and the intensity of the pressure sensed by the pressure sensor being greater than the intensity of the predetermined pressure, the actuator is configured to move the second housing to the open state.

7. The electronic device of claim 1, wherein at least a portion of the contact member is formed of an elastically deformable material compressively deformed by the pressure sensor.

8. The electronic device of claim 1, wherein the contact member is rotatable with respect to the first housing.

9. The electronic device of claim 8, further comprising:
   a support comprising a main support plate disposed in the first housing; and
   a support shaft fixed to the main support plate and rotatably supporting the contact member.

10. The electronic device of claim 1, further comprising:
   a sweeper compressively deformed by the second housing or the pressure sensor and being disposed at a position spaced apart from the contact member in a sliding direction of the second housing.

11. The electronic device of claim 1, wherein the first housing comprises:
a housing body covering at least a portion of the second housing; and
a pad groove recessed from an inner surface of the housing body that faces the pressure sensor, the pad groove accommodating at least a portion of the contact member.

12. The electronic device of claim 11, further comprising:
a support disposed on the housing body; and
a support shaft supported by the support and rotatably supporting the contact member.

13. The electronic device of claim 12, wherein the first housing comprises a plate groove recessed from the inner surface of the housing body, the plate groove accommodating at least a portion of the support and having a depth that is less than a depth of the pad groove.

14. The electronic device of claim 12, further comprising:
a sweeper being compressively deformed by the second housing or the pressure sensor and being disposed on the support.

15. An electronic device comprising:
a first housing;
a second housing slidable relative to the first housing;
a contact member disposed in the first housing;
a pressure sensor disposed in the second housing, the pressure sensor facing the contact member and at least a portion of the pressure sensor contacting the contact member, the pressure sensor comprising a pair of pressure sensors disposed opposite to each other with respect to the second housing, wherein the pair of pressure sensors sense pressures different from each other;
a processor electrically connected to the pressure sensor; and
a support comprising:
a main support plate disposed in the first housing, and
a support shaft fixed to the main support plate and rotatably supporting the contact member,
wherein the processor is configured to:
in response to sensing pressure on both sides of the first housing in which at least one of the pair of pressure sensors senses pressure exceeding a predetermined pressure, automatically switch a state of the second housing from an open state, in which the second housing protrudes from the first housing, to a closed state, in which the second housing is inserted into the first housing, or from the closed state to the open state.

16. The electronic device of claim 15, wherein the pressure sensor comprises a plurality of channels arranged side-by-side in a sliding direction of the second housing and configured to sense pressure.

17. The electronic device of claim 15, wherein at least a portion of the contact member is formed of an elastically deformable material and is compressively deformed by the pressure sensor.

18. The electronic device of claim 15, wherein the support further comprises a sweeper disposed on the main support plate and being compressively deformed by the second housing or the pressure sensor.

19. An electronic device comprising:
a first housing;
a second housing slidable relative to the first housing;
a contact member disposed in the first housing;
a pressure sensor disposed in the second housing, the pressure sensor facing the contact member and at least a portion of the pressure sensor contacting the contact member, the pressure sensor comprising a pair of pressure sensors disposed opposite to each other with respect to the second housing, wherein the pair of pressure sensors sense pressures different from each other;
a support comprising:
a main support plate disposed in the first housing, and
a support shaft fixed to the main support plate and rotatably supporting the contact member;
a printed circuit board (PCB) disposed in the second housing;
an actuator configured to drive the second housing; and
a processor disposed on the PCB and being electrically connected to the pressure sensor and the actuator, the processor being configured to:
recognize a position of the second housing with respect to the first housing,
in response to the pressure sensor sensing an intensity of pressure greater than an intensity of a predetermined pressure, control the actuator to move the second housing relative to the first housing, and
in response to sensing pressure on both sides of the first housing in which at least one of the pair of pressure sensors senses pressure exceeding the predetermined pressure, automatically switch a state of the second housing from an open state, in which the second housing protrudes from the first housing, to a closed state, in which the second housing is inserted into the first housing, or from the closed state to the open state.

20. The electronic device of claim 19, wherein the processor is further configured to:
based on a position at which pressure is applied and sensed by the pressure sensor, determine whether the electronic device is in the open state, the closed state, or an arbitrary state between the open state and the closed state.

21. The electronic device of claim 19,
wherein the support is detachable from the first housing, and
wherein, in a state in which the support is detached from the first housing, access to the contact member by a user is obtained for repairing or replacing the contact member.

22. The electronic device of claim 1, wherein the pressure sensor is configured to output the first signal relating to a position of contact with the contact member.

23. The electronic device of claim 1, wherein the pressure sensor is configured to output the second signal relating to an intensity of pressure applied with the contact member.

* * * * *